United States Patent
Radakovic et al.

(10) Patent No.: US 12,123,726 B2
(45) Date of Patent: Oct. 22, 2024

(54) METHOD AND APPARATUS FOR RIDESHARING PICKUP WAIT TIME PREDICTION

(71) Applicant: HERE Global B.V., Eindhoven (NL)

(72) Inventors: Daniela Radakovic, Chicago, IL (US); Arnold Sheynman, Northbrook, IL (US); Kyle Jackson, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 185 days.

(21) Appl. No.: 17/474,891

(22) Filed: Sep. 14, 2021

(65) Prior Publication Data
US 2022/0082394 A1 Mar. 17, 2022

Related U.S. Application Data

(60) Provisional application No. 63/078,680, filed on Sep. 15, 2020.

(51) Int. Cl.
*G01C 21/34* (2006.01)
*G01C 21/36* (2006.01)

(52) U.S. Cl.
CPC ..... *G01C 21/3438* (2013.01); *G01C 21/3461* (2013.01); *G01C 21/3492* (2013.01); *G01C 21/3605* (2013.01)

(58) Field of Classification Search
CPC combination set(s) only.
See application file for complete search history.

(56) References Cited

U.S. PATENT DOCUMENTS

| | | | |
|---|---|---|---|
| 6,317,686 B1 | 11/2001 | Ran | |
| 6,721,650 B2 | 4/2004 | Fushiki et al. | |
| 10,033,624 B2 | 7/2018 | Rolf et al. | |
| 2003/0135304 A1 | 7/2003 | Sroub et al. | |
| 2008/0024323 A1* | 1/2008 | Kadaba | G08G 1/096775 340/905 |
| 2008/0255754 A1 | 10/2008 | Pinto | |
| 2014/0201121 A1* | 7/2014 | Jones | G06N 5/02 706/46 |
| 2017/0268891 A1* | 9/2017 | Dyrnaes | G01C 21/3492 |
| 2018/0209806 A1* | 7/2018 | Rakah | G01C 21/343 |
| 2019/0220018 A1* | 7/2019 | Goldberg | G05D 1/0088 |

FOREIGN PATENT DOCUMENTS

| | | |
|---|---|---|
| JP | 2004333377 A | 11/2004 |
| WO | 2019083528 A1 | 5/2019 |

\* cited by examiner

*Primary Examiner* — Aryan E Weisenfeld
(74) *Attorney, Agent, or Firm* — DITTHAVONG, STEINER & MLOTKOWSKI

(57) ABSTRACT

An approach is provided for accurate travel time prediction. The approach involves, for example, determining probe data collected within a threshold proximity of a vehicle location and a pickup location. The probe data may be collected, for example, from a location sensor of at least one probe vehicle that has previously traversed the vehicle location and the pickup location. The approach also involves processing the probe data to identify a travel time of a route taken by the at least one probe vehicle from the vehicle location to the pickup location. The approach also involves providing the travel time as an output indicating a wait time for a vehicle at the vehicle location to reach the pickup location.

20 Claims, 14 Drawing Sheets

METHOD AND APPARATUS FOR RIDESHARING PICKUP WAIT TIME PREDICTION

RELATED APPLICATION

This application claims priority from U.S. Provisional Application Ser. No. 63/078,680, entitled "METHOD AND APPARATUS FOR RIDESHARING PICKUP WAIT TIME PREDICTION," filed on Sep. 15, 2020, the contents of which are hereby incorporated herein in their entirety by this reference.

BACKGROUND

The use of ridesharing services has become ubiquitous, and users are expecting a good rideshare customer experience. One part of this good customer experience is providing a reliable estimate of the wait time from the time a user requests a ride to the time a ridesharing service provider (e.g., a rideshare driver) picks up the user (e.g., a pickup wait time prediction). Accordingly, ridesharing companies and service providers face significant technical challenges to calculate accurate pickup wait time predictions particularly when the pickup distance between a customer and a ridesharing service provider is short when compared to uncertainties in the data used to make the prediction (e.g., uncertainties in location estimation, traffic estimation, route selection, etc.).

SOME EXAMPLE EMBODIMENTS

Therefore, there is a need for an approach for accurately determining a service requestor's pickup wait time (e.g., particularly in areas such as city centers where the distance between service providers and service requestors is short or where traditional prediction uncertainties are high).

According to one embodiment, a method comprises determining probe data (e.g., location trajectory data) collected within a threshold proximity of a vehicle location and a pickup location. By of example, the probe data is collected from a location sensor of at least one probe vehicle that has previously traversed through the vehicle location and the pickup location. The method also comprises processing the probe data to identify a travel time of a route taken by the at least one probe vehicle from the vehicle location to the pickup location. The method further comprises providing the travel time as an output indicating an initial wait time for a vehicle at the vehicle location to reach the pickup location.

According to another embodiment, an apparatus comprising at least one processor, and at least one memory including computer program code, the at least one memory and the computer program code configured to, with the at least one processor, cause the apparatus to determine probe data (e.g., location trajectory data) collected within a threshold proximity of a vehicle location and a pickup location. By of example, the probe data is collected from a location sensor of at least one probe vehicle that has previously traversed the vehicle location and the pickup location. The apparatus is also caused to process the probe data to identify a travel time of a route taken by the at least one probe vehicle from the vehicle location to the pickup location. The apparatus is further caused to provide the travel time as an output indicating a wait time for a vehicle at the vehicle location to reach the pickup location.

According to another embodiment, a non-transitory computer-readable storage medium for predicting a pickup wait time, carrying one or more sequences of one or more instructions which, when executed by one or more processors, cause an apparatus to determine probe data (e.g., location trajectory data) collected within a threshold proximity of a vehicle location and a pickup location. By of example, the probe data is collected from a location sensor of at least one probe vehicle that has previously traversed the vehicle location and the pickup location. The apparatus is also caused to process the probe data to identify a travel time of a route taken by the at least one probe vehicle from the vehicle location to the pickup location. The apparatus is further caused to provide the travel time as an output indicating a wait time for a vehicle at the vehicle location to reach the pickup location.

According to another embodiment, an apparatus comprises a means for determining probe data (e.g., location trajectory data) collected within a threshold proximity of a vehicle location and a pickup location. By of example, the probe data is collected from a location sensor of at least one probe vehicle that has previously traversed the vehicle location and the pickup location. The apparatus also comprises means for processing the probe data to identify a travel time of a route taken by the at least one probe vehicle from the vehicle location to the pickup location. The apparatus further comprises means for providing the travel time as an output indicating a wait time for a vehicle at the vehicle location to reach the pickup location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for providing an accurate wait time prediction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
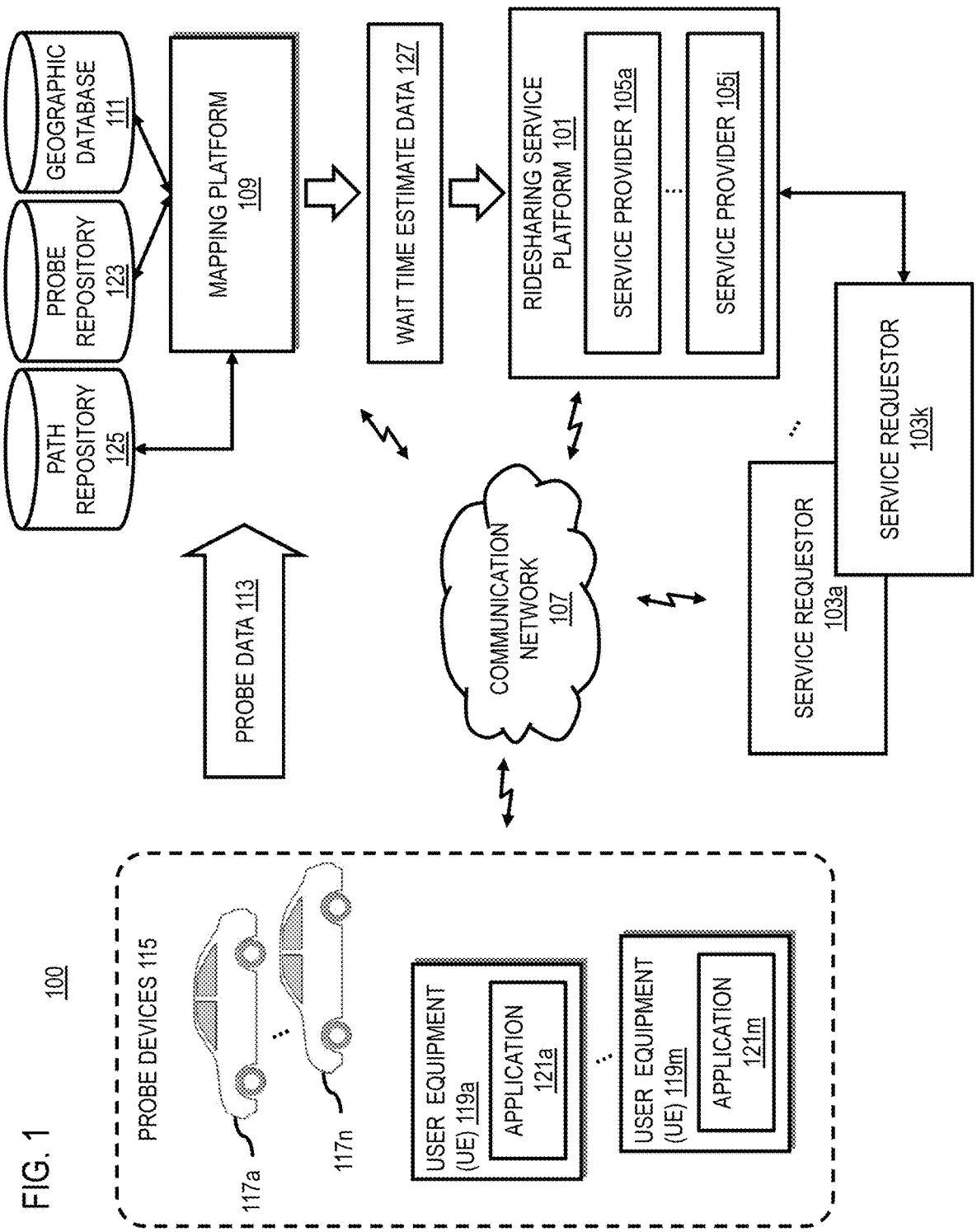
FIG. 1 is a diagram of a system capable of providing an accurate pickup wait time prediction, according to one embodiment.

FIG. 1 is a diagram of a system 100 capable of providing an accurate pickup wait time prediction, according to one embodiment. The use of ridesharing services (e.g., provided via a ridesharing service platform 101) has become ubiquitous. For example, in many city centers, the density of both service requestors 103a-103k (e.g., collectively referred to as service requestors 103 who are customers requesting rides) and ridesharing service providers 105a-105j (e.g., also collectively referred to as ridesharing service providers 105 who are drivers of ridesharing vehicles or the ridesharing vehicles themselves) is high. As a result, the distance between a service requestor 103 and a service provider 105 can be relatively short, and so can be the pickup wait time (e.g., the wait time for the service provider 105 to pick up the service requestor 103 after a ride is requested from the ridesharing service platform 101 over a communication network 107). In order to provide a good rideshare customer experience, a ridesharing company can seek to minimize the time customer waits for a pickup and to give the customer a reliable estimate of the wait time.

In general, a route can be defined by its start, its end (destination), and an ordered series of road segments between those two points. A mapping platform 109, for instance, can use a node-link representation or equivalent to represent a network of road segments in a geographic database 111 (e.g., see the description of the geographic database 111 below for a detailed discussion of the node-link representation). The travel time for a selected route is a period of time a vehicle takes to traverse all road segments from route's start to end. Both route selection and travel time prediction algorithms, for instance, can be based on the knowledge of traffic conditions along the route, which for a given road segment are traditionally represented by either a road segment's speed or equivalently a road segment's travel time. Therefore, these algorithms are heavily impacted by the accuracy of the road segment speed. By way of example, the road segment speed is calculated by processing the speed data of the vehicles on the road segment through a traffic model. The accuracy of calculated road segment speed may be measured as the difference between calculated road segment speed and the actual speed of a vehicle on that road segment. The accuracy is higher when the difference is smaller.

Establishing accurate road segment speed is a difficult technical problem due to the highly dynamic nature of traffic as well as the inherent properties of the algorithms used for speed computation. These algorithms are commonly based on some type of averaging of vehicle speeds received from the road segment within a temporal window. The averaging is utilized to stop the algorithm from overreacting to the speed outliers. The temporal windowing supports collection of larger number of inputs, e.g., reported vehicle speeds in order to compute traffic speed with a higher degree of confidence. Both mechanisms influence the road segment speed in a way that can have a decidedly negative impact in terms of travel time prediction and route selection for short routes and/or for scenarios in which the error or uncertainty of the road segment speed is high. For example, the utilization of the temporal window unnecessarily can pollute the most recent and relevant vehicle speed data with less relevant older vehicle speeds. The averaging across all the vehicles on a road segment can also introduce irrelevant speed information from the perspective of a specific route. The reason being that the speed on the same road segment might differ depending on the next segment to be traversed, e.g., a vehicle may traverse the same road segment and turn left at its end, turn right at its end, or continue straight. Given a specific route, on a particular road segment the only vehicles with relevant speed information are the ones traversing it in accordance with the order of road segments in the route. For example, if the road segment that is part of the route needs to be traversed without taking any turns, the speeds of vehicles taking a left turn and slowing down before clearing the intersection are not representative.

Finally, once road segment speed has been determined, the routing algorithms find the series of road segments between the start and end of the route such that the travel time on the route is minimized using as the input the road segments' speed. The estimated travel time (e.g., the pickup wait time in a ridesharing service use case) is then, for a given route, computed based on the travel time of the segments and additional routing parameters. Therefore, using the speeds of the nonrepresentative vehicles (e.g., vehicles turning left as opposed to vehicles making no turns) as part of a pickup wait time calculation can result in less accurate estimates and a degraded user experience (e.g., by giving the service requestor 103 an inaccurate wait time so that the service requestor 103 wastes too much time waiting, or misses the actual pickup time thereby causing the ridesharing service provider 105 to have to wait for the service requestor 103 at the pickup location).

In other words, the minimization and accurate prediction of customer pickup wait time (particularly in dense urban areas) is a complex technical problem. This is partly a consequence of algorithm input data not being sufficiently representative (e.g., as discussed above) and partly a consequence of a non-unified approach to route selection and prediction of travel time to a service requestor 103 (e.g., the pickup wait time).

To address these technical challenges, the system 100 of FIG. 1 introduces a capability to improve the accuracy of ridesharing customer pickup wait time predictions. In one embodiment, the system 100 considers the most recent and most route specific individual vehicle speed data available for route selection and pickup wait time prediction. For example, the vehicle speed data can be determined from probe data 113 (e.g., a time sequence of location data points associated with an individual probe device 115–<probe identifier, time, latitude, longitude>) collected from one or more probe devices 115 as they travel in a road network. The probe data 113 can be collected in real-time to represent current travel conditions in the road network or can be historical data representing historical travel conditions in the road network. The probe devices 115, for instance, can include one or more location-sensor equipped vehicles 117a-117n (also referred to as vehicles 117 or floating cars) and/or one or more location-equipped user equipment (UE) devices 119a-119m (e.g., smartphones, portable or built-in navigation devices, etc.) executing respective applications 121a-121m (e., navigation, mapping, or other location-based applications) associated with the vehicles 117. The mapping platform 109 (e.g., a traffic or mapping system) can then store the received probe data 113 in a probe repository 123 where the probe data 113 can be processed into trajectories representing routes or paths traveled by the probe devices 115. These paths can then be stored in a path repository 125 for use in determining a pickup wait time prediction and/or pickup route.

In one embodiment, the system 100 replaces the traditional traffic system comprised of three mostly separate algorithms that run consecutively (e.g., firstly road segment speed computation using a traffic model, secondly route selection based on the road segments speeds, and lastly travel time prediction for the selected route using as input the road segment speeds), with a single algorithm that produces both the route and predicted pickup wait time (e.g., wait time estimate data 127) to output or provide to the ridesharing service platform 101 or other user of the wait time estimate data 127. In one embodiment, the system 100 (e.g., via the mapping platform 109) generates the predicted pickup wait time value (e.g., wait time estimate data 127) as a high confidence range and continuously updates it based on the most recent vehicle speed information (e.g., determined from individual paths in the probe repository 125 that traverse between the location of the customer and the location of the ridesharing driver that is to provide a ride during the most recent designated time epoch). The continuous update allows the system 100 to adapt the pickup wait time prediction/pickup route to sudden changes in the traffic conditions, while guaranteeing a high confidence.

Figure 2:
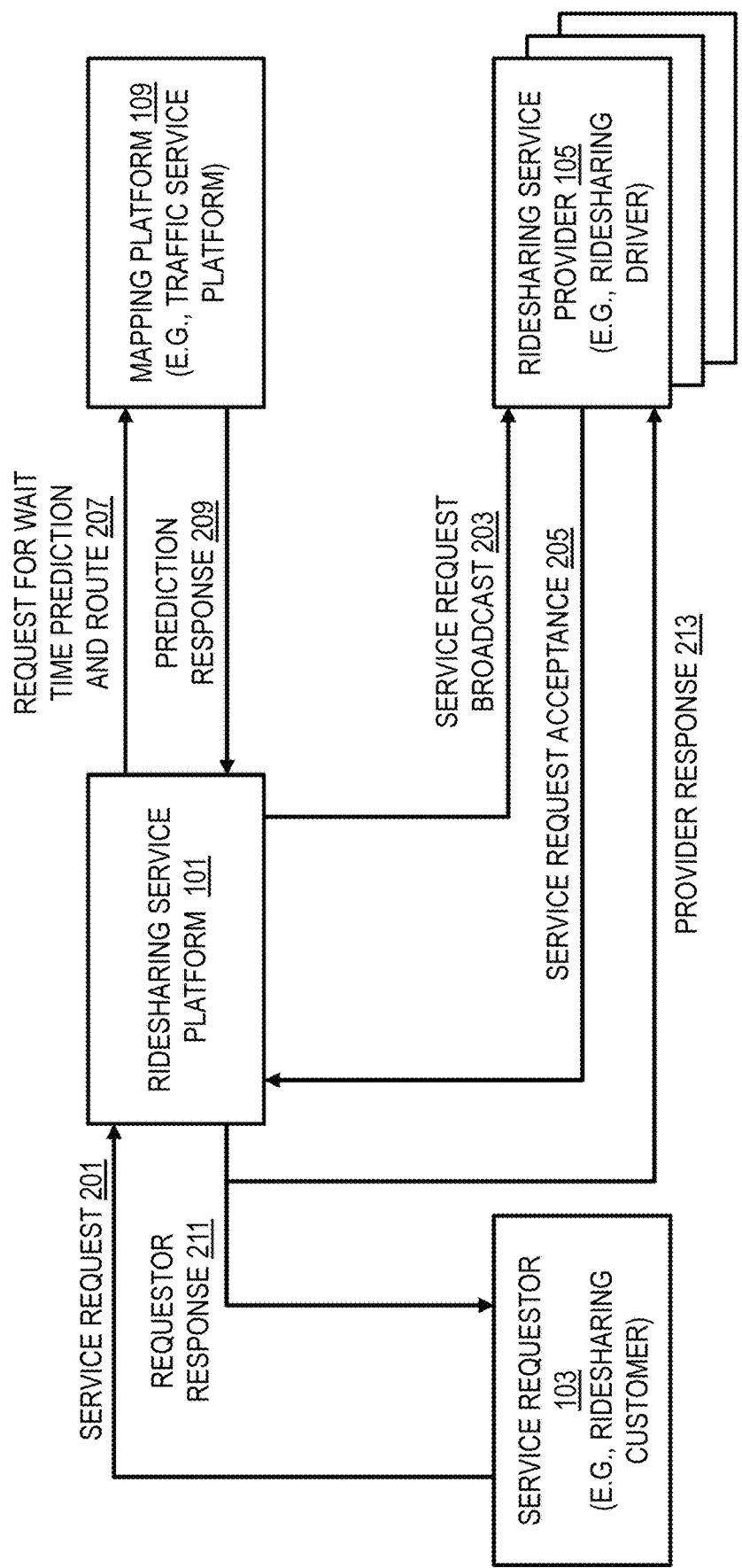
FIG. 2 is a diagram illustrating an example overview of a process for providing a pickup wait time prediction, according to one embodiment.

FIG. 2 is a diagram illustrating an example overview of a process for providing a pickup wait time prediction, according to one embodiment. As shown, the initial step in this example is a service request 201 from a service requestor 103 (e.g., a ridesharing customer) for a ride. The service request 201 can include the requestor's location or any other designated location where the service requestor 103 would like to be picked up (e.g., requestor location). In an embodiment, the service requestor 103 uses a service requestor device (e.g., a mobile device such as a UE 119 or equivalent via an application 121—ridesharing application) to generate and send the service request 201 to the ridesharing service platform 101 (e.g., operated by a ridesharing company or service).

The ridesharing service platform 101 receives the service request 201 and dispatches the service request 201 to its fleet of ridesharing service providers 105. For example, the ridesharing service platform 101 can generate and transmit a service request broadcast 203 based on the service request 201 to one or more ridesharing service providers 105 (e.g., ridesharing drivers) via their respective devices (e.g., UEs 119 or equivalent device executing an corresponding application 121—ridesharing service provider application). The service request broadcast 203 specifies at least the requestor location and/or any other specified parameters (e.g., vehicle type, vehicle amenity, etc.). In one embodiment, the service request broadcast 203 may be transmitted to only those ridesharing service providers 105 within a spatial and/or temporal threshold from the service requestor 103's location provided in the service request broadcast 203. In addition or alternatively, the service request broadcast 203 can be limited to by criteria and/or preferences specified by the service requestor 103 and/or ridesharing service providers 105. The ridesharing service providers 105, for instance, can include drivers and/or vehicles (e.g., autonomous vehicles) capable of rendering ridesharing services to the service requestor 103. After receiving the service request broadcast 203, at least one ridesharing service provider 105 can accept the service request broadcast 203 by transmitting a service request acceptance message 205 back to the ridesharing service platform 101. The service request acceptance message 205 can specify identification information and a current location of the ridesharing service provider 105 (e.g., service provider location).

Once a request is accepted by one or more of the ridesharing service providers 105, the ridesharing service platform 101 passes the locations of both the service requestor 103 and the ridesharing service provider 105 in a request 207 for a wait time prediction (or wait time range prediction) and/or route from the service provider location to the requestor location. In one embodiment, the request 207 can also specify additional parameters for generating the prediction and/or route including, but not limited to, a maximum wait time, requestor vicinity radius, service provider vicinity radius, and/or the like. Once the mapping platform 109 receives the request 207 for pickup wait time prediction and/or pickup route, the mapping platform 109 generates the requested route (e.g., a fastest route, shortest route, and/or route based on any other routing cost function) and pickup wait time prediction. The pickup wait time prediction can be a specific time value or a time range in which the customer pickup is predicted to occur.

In one embodiment, to determine the pickup wait time prediction and/or pickup route, the mapping platform 109 interacts with the probe repository 123 to retrieve real-time and/or historical probe data 113 collected from a geographic area encompassing the requestor location of the service requestor 103 and the service provider location of the accepting ridesharing service provider 105 (e.g., based on the provided requestor vicinity radius and/or service provider vicinity radius). The mapping platform can then process the probe data 113 to determine unique paths or probe trajectories traveled by individual probe devices 115. The paths or probe trajectories can be stored, for instance, in a path repository 125. The mapping platform 109 can determine one or more individual paths from the path repository 125 that pass through or traverse the requestor location and service provider location of interest. The pickup wait time prediction and/or pickup route can be based on the travel time between the requestor location and service provider location as indicated in the individual probe paths (e.g., path with the fastest time between the service provider location and the requestor location). If there are multiple different paths taken by different probe devices 115 between the requestor location and service provider location, then the mapping platform 109 can apply any applicable path selection criteria (e.g., fastest path, shortest path, etc.). In other words, the mapping platform 109 uses the observed travel time and/or route of one or more probe devices 115 as indicated by respective individual probe paths to estimate travel time/customer pickup time (e.g., generate the wait time estimate data 127) with increased accuracy (e.g., as a opposed to traditional approach that is based on average speed per road segment).

In one embodiment, the prediction response 209 provided by the mapping platform 109 in response to the wait time prediction request 207 comprises the predicted wait time value or range of values and/or a pickup route from the service provider location to the requestor location. The prediction response 209 represents, for instance, the wait time estimate data 127. In some embodiments, the wait time estimate data 127 indicates an initial wait time for a vehicle at the service provider location to reach the service requestor location (i.e., the pickup location). As shown, the prediction response 209 is transmitted from the mapping platform 109 to the ridesharing service platform 101.

Next, the ridesharing service platform 101 relays the predicted pickup wait time range to the service requestor 103 (e.g., via requestor response 211) and both the predicted pickup wait time range and pickup route to the ridesharing service provider 105 that accepted the initial service request 201 (e.g., via provider response 213). In other words, the responses 211 and 213 can include all or a portion of the wait time estimate data 127. In some embodiments, the wait time estimate data 127 comprises a time duration corresponding to the amount of time it will take the service provider 105 to travel to the service requestor 103's location (i.e., a wait time). In other embodiments, the wait time estimate data 127 comprises a time at which the service provider 105 is determined to arrive at the service requestor 103's location (i.e., the service provider 105's estimated time of arrival). In other embodiments, the wait time estimate data 127 further comprises a route from the service provider 105's location to the service requestor 103's location. In other embodiments, the wait time estimate data 127 comprises a plurality of routes from which the service provider 105 can select.

To summarize, in one embodiment, the system 100 receives a route request from a customer comprising at least the customer's location information (e.g., end point of a pickup route) and the corresponding ride request timestamp. The system 100 then identifies the area around the customer location having a radius (or other equivalent boundary) no greater than a predefined length. The system 100 receives information from a service provider vehicle comprising at least the vehicle's location (e.g., a start point of a pickup route) and the ride request's timestamp. The system 100 then identifies from a plurality of reported probes, one or more probe vehicles that traversed through the identified start point (e.g. the service provider vehicle's location) within a vicinity or area defined by a radius around the service provider and end point (e.g., the customer's pickup location) within a vincinity area defined by a radius around the customer's location. In one embodiment, the extent of the radius (e.g., vicinity) around the service provider and/or customer locations can be selected independently and may depend on factors such as but not limited to probe data sparsity, target wait time prediction accuracy, etc. For example, in areas where there are a low number of recorded probe traces, increasing the radius around the service provider and/or customer location can increase the likelihood of finding recorded location traces that traverse the start and end points. On the other hand, decreasing the radii can select for location traces that more precisely pass through the start and end points to provide for potentially more accuracy wait time estimations. In some embodiments, the radii can be specified dynamically based on contextual parameters (e.g., probe data sparsity). For example, as the amount of available probe data in an area increases or decreases, the radius can also be changed correspondingly.

In one embodiment, the system 100 can further select the probe traces based on probes occurring within a predefined time interval. For example, the time interval can correspond to the time interval in which a ride is being requested by the customer so that the selected probes are more likely to represent the travel or road conditions of the ride request. The system 100 can also determine the corresponding routes (e.g., by map matching to road links of the geographic database 111) and travel times (e.g., by determining the time difference between the timestamps of the start and end points) associated with the identified location traces. The system 100 estimates an initial wait time by selecting a travel time from the plurality of identified travel times having a start time stamp closest to the ride request time stamp. In one embodiment, the system 100 periodically adjusts the initial wait time and reports the wait time to the customer, ridesharing service provider, and/or ridesharing service.

Figure 3:
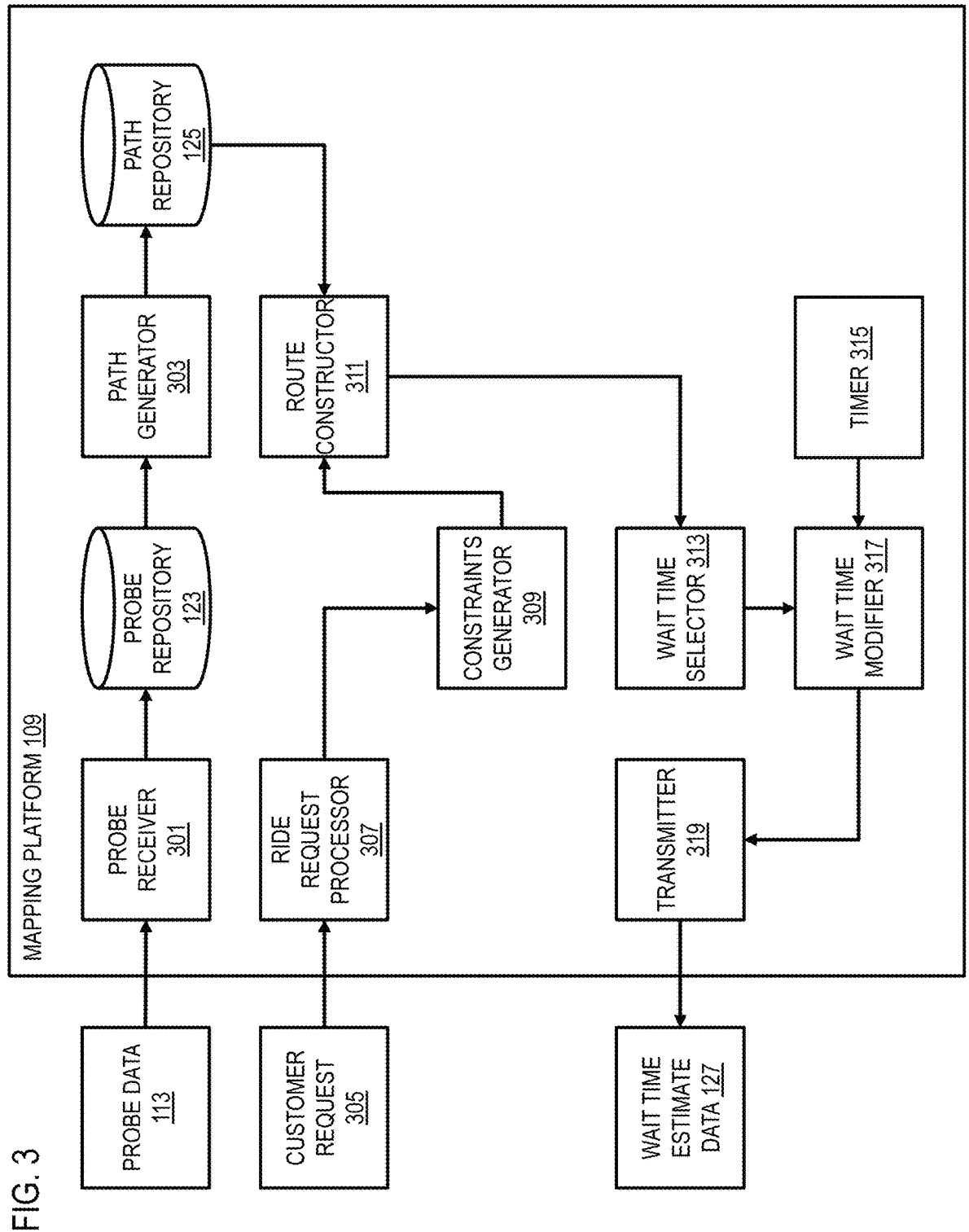
FIG. 3 is a diagram of components of the mapping platform for providing an accurate wait time prediction, according to an embodiment.

As described above, the mapping platform 109 performs the processes associated with determining pickup wait time and/or pickup routes according to the various embodiments described herein. FIG. 3 is a diagram of components of the mapping platform 109 (e.g., a traffic service provider) for providing an accurate wait time prediction, according to an embodiment. As shown, the mapping platform 109 may include or be communicatively connected to one or more components such as: a probe receiver 301, probe repository 123, path generator 303, path repository 125, ride request processor 307, constraints generator 309, route constructor 311, wait time selector 313, timer 315, wait time modifier 317, and transmitter 319.

As shown, in one embodiment, the probe receiver 301 is capable of receiving and filtering probe data 113 from a plurality of probe devices 115 (e.g., floating cars that are configured to sample their locations and report them at designated frequencies as they travel) for storage in the probe repository 123 or equivalent. The path generator 303 then generates pairs or sequences of time consecutive probes (e.g., location data samples) received from the floating cars or probe devices 115 having the same probe or vehicle identifier for storage in the path repository 125. These pairs or sequences of probes represent one or more paths traveled by individual probe devices 115 or vehicles from which a pickup wait time and/or pickup route can be determined according to the embodiments described herein.

In one embodiment, as a separate process, the ride request processor 307 can asynchronously receive and process a customer request 305 for a ride. The customer request 305 can be associated with service provider information indicating from which ridesharing service the customer is requesting a ride. The constraints generator 309 (e.g., a time-space constraint generator) then generates time-space vicinities (or any other constraints) based on the information received in the customer request 305 and/or corresponding ridesharing service. For example, the constraints generator 309 can examine various constraints such as, by way of example, maximum acceptable distance and/or maximum acceptable time between the customer and a responding ridesharing vehicle (e.g., time-space vicinities) specified by the customer and/or the ridesharing service. The route constructor 311 compiles a plurality of routes from the customer time-space vicinity constraint to service provider time-space vicinity upon receiving information from the constraints generator 309. For example, in a use case example where the time-space vicinities allow for a maximum wait time of 10 minutes and/or a maximum distance between customer and ridesharing vehicle is 1 mile, the route constructor 311 compiles routes based on paths from the path repository having a maximum travel time of 10 minutes or less and/or maximum travel distance of 1 mile or less.

In one embodiment, the wait time selector 313 then selects a route from said plurality of routes that minimizes the customer pickup wait time. In doing so, the wait time selector 313 may, for example, rank the candidate routes by estimated wait time. In addition or alternatively, the wait time selector 313 can return multiple pickup wait time and/or route options which can be presented to the customer and/or ridesharing service for selection. In another embodiment, the timer 315 can be used to trigger a wait time adjustment (e.g., based on any applicable adjustment criteria). The wait time modifier 317 can adjust the wait time upon receiving a signal from the timer 315. The wait time modifier 317 can modify the determined wait time based on relevant factors, for example, the timestamp of the service request, the time of day, and whether a special event is anticipated to impact the route. The transmitter 319 (e.g., a route and wait time transmitter) can transmit the wait time to the requesting customer and the wait time and route to the corresponding ridesharing service provider as wait time estimate data 127.

It is contemplated that the functions of the components described above may be combined in one or more components or performed by other components of equivalent functionality. Though depicted as a separate entity in FIG. 1, it is contemplated that the mapping platform 109 may be implemented as a module of any of the components of the system 100 (e.g., ridesharing service platform 101, application 121, and/or the like). In another embodiment, one or more of the modules depicted in FIG. 3 may be implemented as a cloud-based service, local service, native application, or a combination thereof. The functions of the mapping platform 109 and its components are described in more detail with respect to FIGS. 4-9 below.

Figure 4:
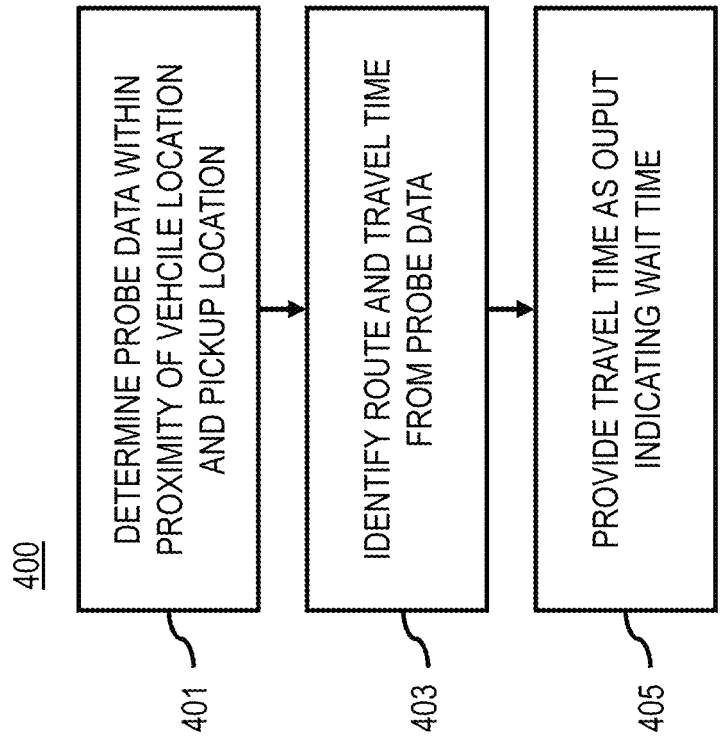
FIG. 4 is a flowchart of a process for providing a pickup wait time prediction, according to an embodiment.

FIG. 4 is a flowchart of a process for providing a pickup wait time prediction, according to an embodiment. In one embodiment, the mapping platform 109 and/or any of its components may perform the process 400 and may be implemented in, for instance, a chip set including a processor and a memory as shown FIG. 13. As such, the mapping platform 109 and/or any of its components can provide means for accomplishing various parts of the process 400, as well as means for accomplishing embodiments of other processes described herein alone or in conjunction with other components of the system 100. Although processes 400 is illustrated and described as a sequence of steps, it is contemplated that various embodiments of the processes 400 may be performed in any order or combination and need not include all of the illustrated steps.

In one embodiment, the inputs to the process 400 (e.g., the algorithm illustrated by the process 400) are locations of a service requestor 103 and a ridesharing service provider 105, as well as a timestamp of when the service (e.g., a ride) is requested. It is contemplated that these inputs can be provided using any means. For example, in a ridesharing use case, the service requestor 103 can use a ridesharing application (e.g., application 121) executing on a mobile device (e.g., UE 119) to request a ride from the ridesharing service platform 101. As part of this request, the UE 119 can determine the service requestor 103's location and transmit the requestor location to the ridesharing service platform 101. As described in the embodiments above, the ridesharing service platform 101 broadcast the customer service request to its fleet of ridesharing service providers 105. When one of the ridesharing service providers 105 accepts the service request, the ridesharing service provider 105 (e.g., via a corresponding UE 119 executing a ridesharing provider application 121) can also transmit its current location. The ridesharing service platform 101 can then transmit both the service requestor location and the service provider location to the mapping platform 109 to initiate the process 500. In one embodiment, the ridesharing service platform 101 can also transmit time-space vicinity parameters or other constraints that can be used by mapping platform 109 to determine a pickup wait time prediction and/or a pickup route.

On receiving a request for a pickup wait time prediction and/or pickup route, in step 401, the mapping platform 109 determines probe data 113 that has been collected within a threshold proximity of a vehicle location (e.g., location of the ridesharing service provider 105 at the time a service request is accepted) and a pickup location (e.g., location of the service requestor 103 initiating the service request or other location specified by the service requestor 103). For example, the probe data 113 can be determined by querying the probe repository 123 for real-time and/or historical probes collected from within the threshold proximity of the customer and ridesharing service provider locations. The threshold proximity may be determined based on inputs received from the ridesharing service platform 101, predetermined by the mapping platform 109, optionally set by a user or system administrator, or dynamically adjusted based on certain factors such as environment, time of time, urgency of request, etc. In some exemplary embodiments, the probe data 113 may be collected from a location sensor of a probe device 115 (e.g., probe vehicle 117 and/or probe UE 119).

Figure 5:
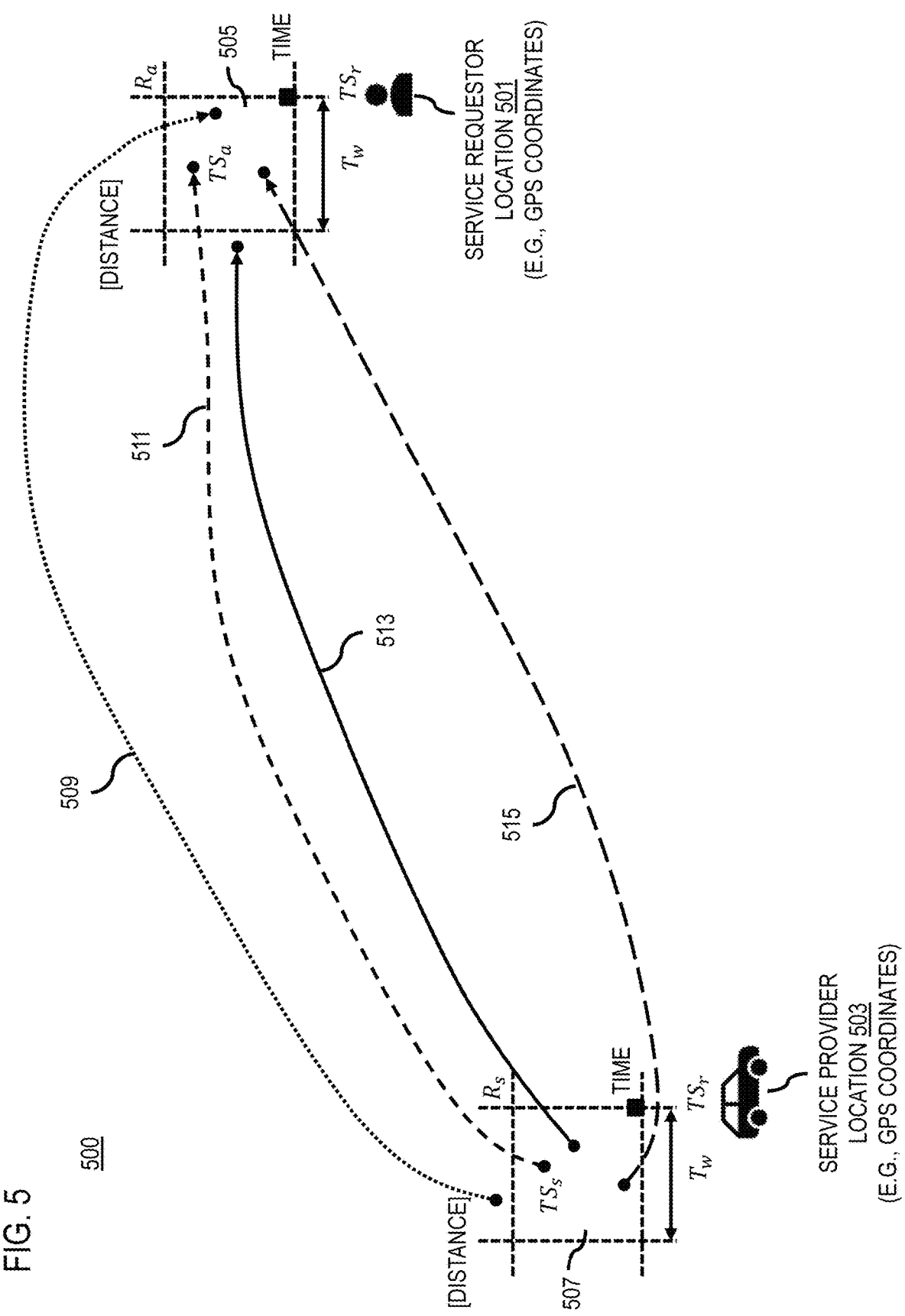
FIG. 5 is a diagram illustrating an example of pickup wait time and/or pickup route prediction, according to one embodiment.

The process 400 is further described with respect to FIG. 5 which is a diagram illustrating an example of pickup wait time and/or pickup route prediction, according to one embodiment. In the example of FIG. 5, the inputs to the process 400 are a service requestor location 501 (e.g., GPS coordinates or equivalent location of a customer requesting a ride) and ridesharing service provider location 503 (e.g., GPS coordinates or equivalent location of a ridesharing vehicle or driver that can accept a ride request from the customer), as well as a timestamp of when the service requestor or customer has requested a ride $TS_r$. Also, in one embodiment, the following algorithm parameters can be pre-selected by the ridesharing service platform 101 for a specific geographic area: interval $T_w$, radius $R_a$, and radius $R_s$. These parameters represent time-space constraints or vicinities for use in determining the requested pickup wait time and/or pickup route prediction. The value of interval $T_w$ drives or represents the range of acceptable pickup wait times (e.g., acceptable to the customer, the ridesharing service provider, ridesharing service platform 101, mapping platform 109, and/or the like). For example, in one embodiment, only routes that have a high confidence of having a pickup wait time smaller than $T_w$ are returned by the mapping platform 109. The radius $R_a$ is used to define an area 505 considered to be an acceptable vicinity of the customer or service requestor location 501, and the radius $R_s$ is used to define an area 507 considered to be an acceptable vicinity of the service provider location 503. It is expressly contemplated that such variables are exemplary in nature and that other embodiments may utilize other parameters in conjunction with, in lieu of, and/or in addition to the parameters identified herein, including variables representative thereof, without departing from the contemplated embodiments.

Figure 6:
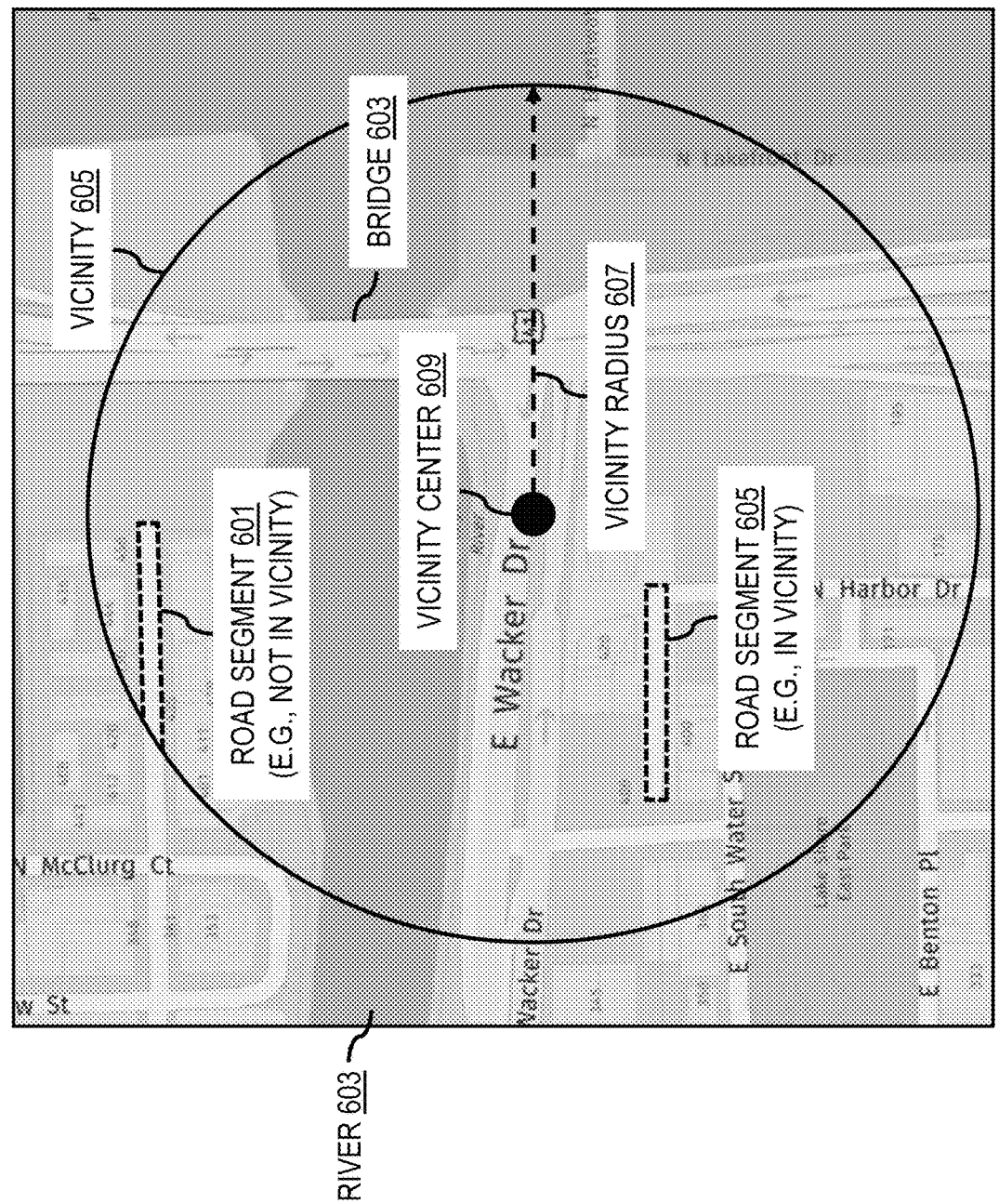
FIG. 6 is a diagram illustrating examples or road segments that are in and not in a vicinity for wait time prediction, according to one embodiment.

In one embodiment, the vicinity (e.g., areas 505 and 507 representing time-space vicinities) is effectively comprised of a set of road segments that are located within the predefined radius (e.g., areas 505 and/or 507) and connected to the center of the vicinity by the other road segments that already belong to the vicinity. As shown in the example of FIG. 6, road segments (e.g., road segment 601) on the other side of the river 603 which though within vicinity 605 (e.g., a geographic within a designated radius 607 from the vicinity center 609) require driving outside of the vicinity 605 to the nearest bridge 611 to cross the river 603 are excluded from the vicinity 605.

In one embodiment, though radius parameters $R_a$ and $R_s$ are selected independently from interval $T_w$, they are closely related to the interval and can be selected with that in mind. One possible, but not exclusive, option is to select the vicinity radius based on the maximum allowed wait time and historic speed pattern for the time of the day and geography.

Returning to step 403 of the process 400, after retrieving or otherwise determining the probe data 113 of interest, the mapping platform 109 processes the probe data 113 to identify a travel time of a route or path taken by a probe device 115 when traversing from the vehicle location (e.g., the ridesharing service provider location 503) to the pickup location (e.g., the service requestor location 501), according to an embodiment. In one embodiment, the mapping platform 109 can use a two-part algorithm to determine the previously observed probe paths or routes to use for determining a pickup wait time prediction and/or pickup route. For example, the first part of the algorithm is concerned with creating and continuously updating the path repository 125 containing at least part of the input data for the route selection and pickup wait time prediction. One example embodiment of building and updating of the path repository 125 is illustrated in the flow diagram of FIG. 7.

Figure 7:
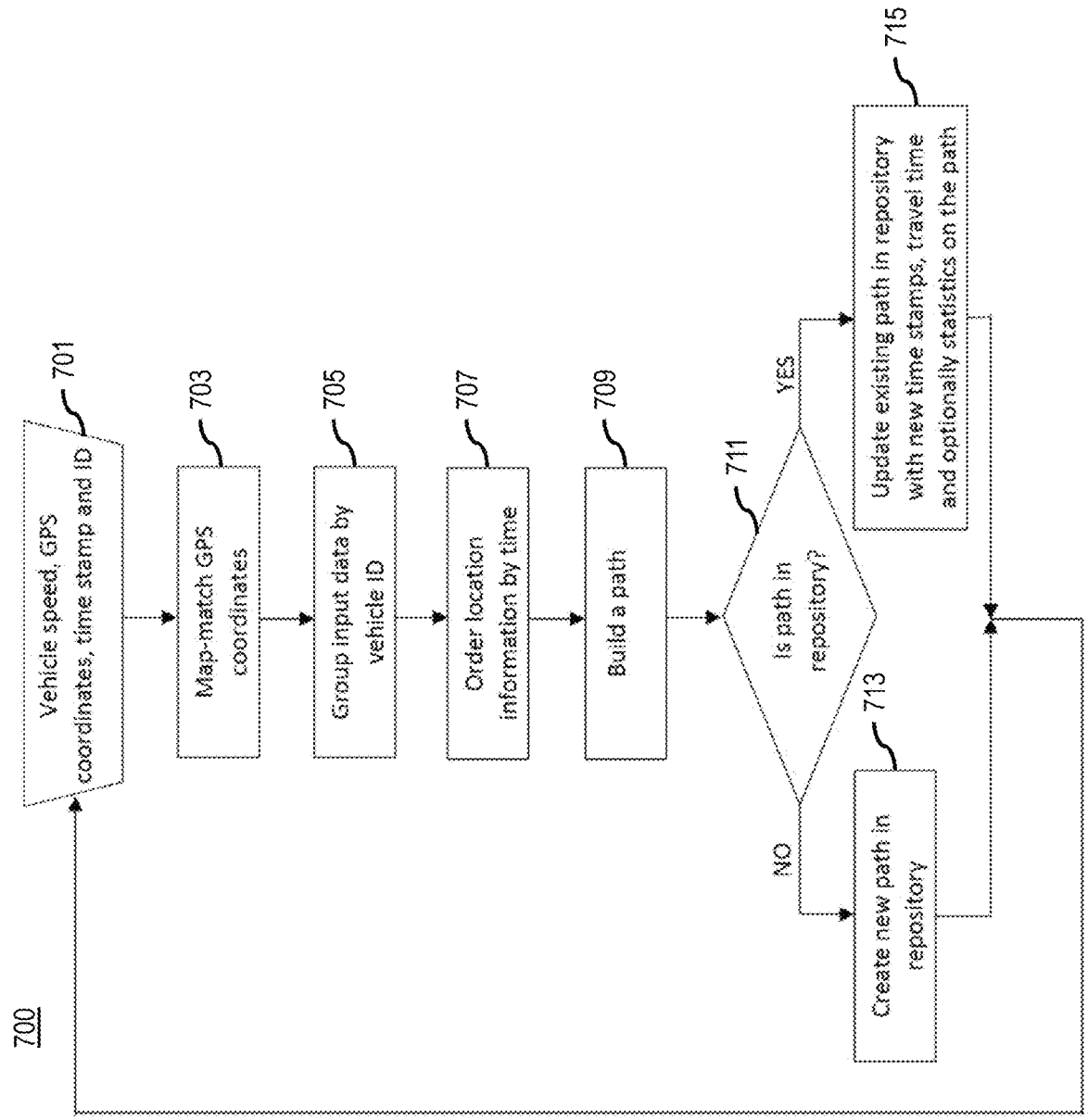
FIG. 7 is a flowchart of a process for creating and building a path repository for pickup wait time prediction, according to one embodiment.
Figure 8:
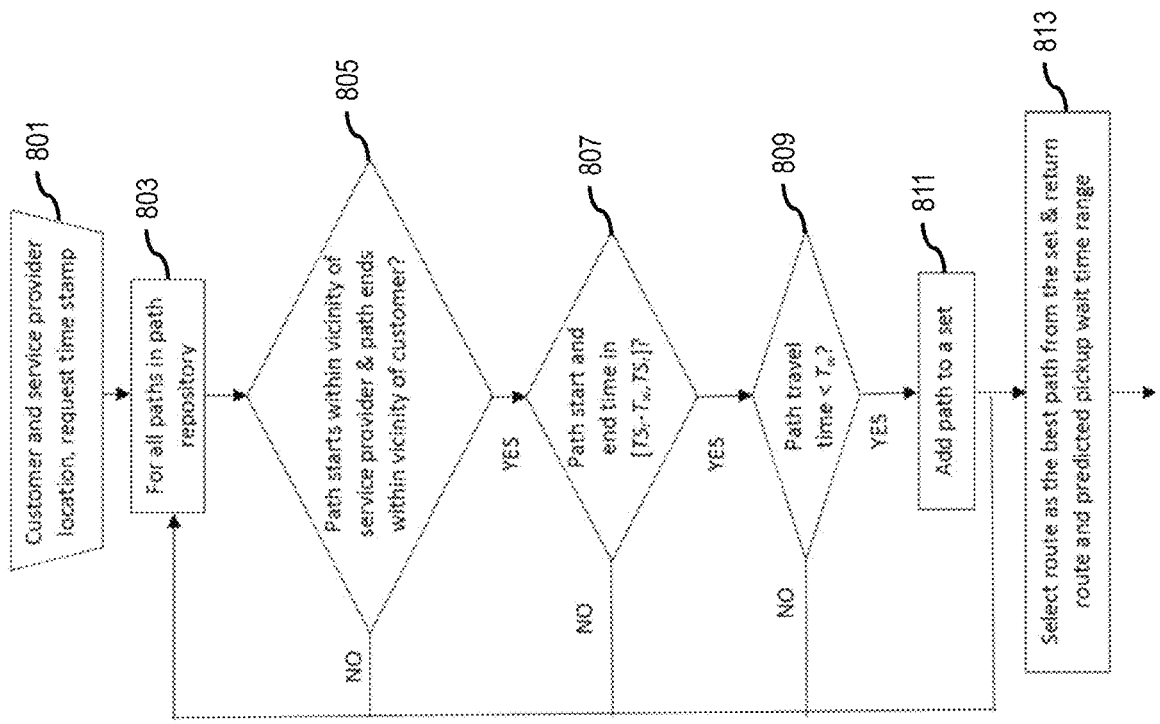
FIG. 8 which is a flowchart of a process for using a path repository to predict pickup wait times and/or select pickup routes, according to one embodiment.
Figure 13:
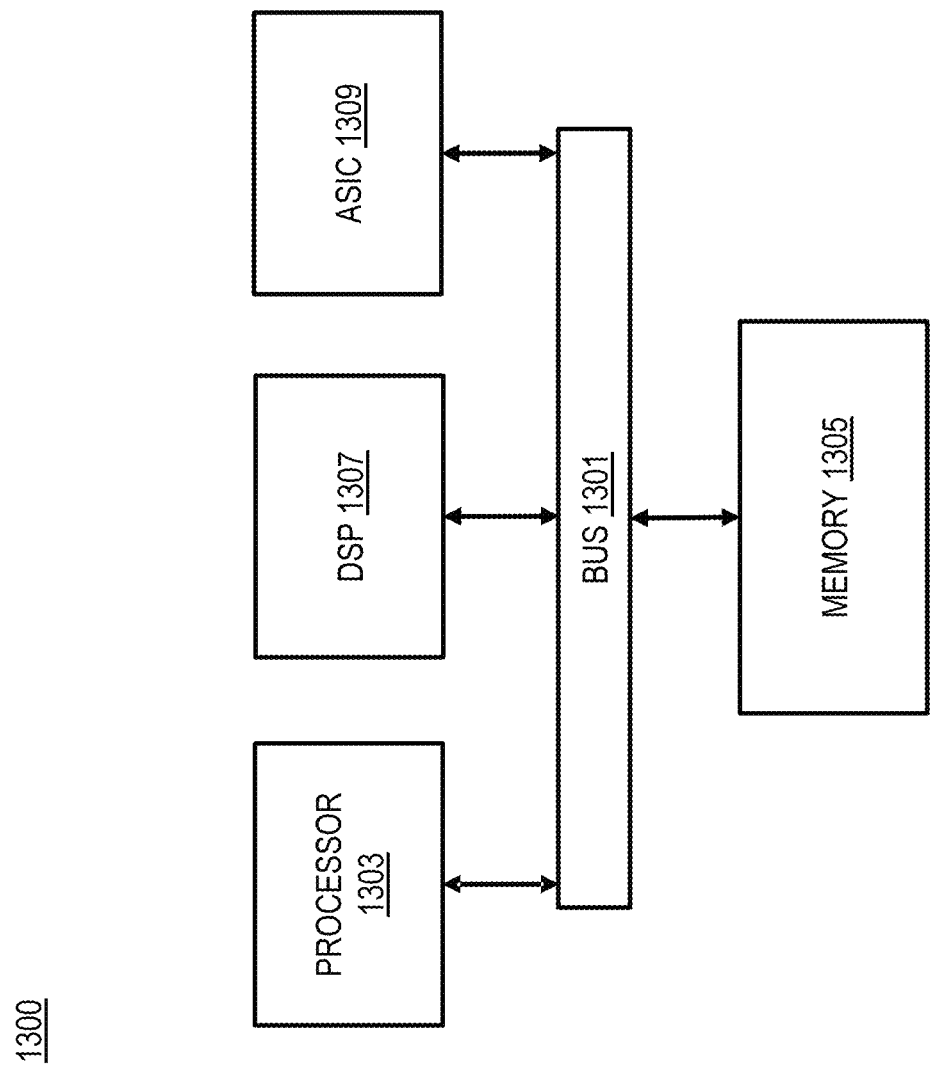
FIG. 13 is a diagram of a chip set that can be used to implement an embodiment.

FIG. 7 is a flowchart of a process for creating and building a path repository 125 for pickup wait time prediction, according to one embodiment. In various embodiments, the mapping platform 109 and/or any of its components as depicted in, for example, FIG. 3, may perform one or more portions of the process 700 and may be implemented in, for instance, a chip set including a processor and a memory as shown in FIG. 13. As such, the mapping platform 109 and/or any of its components can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In general, traffic model systems use as input vehicle speed data also known as the probe data 113. As shown in block 701, the data contains at least the time stamp indicating when the probe location data point was collected, GPS coordinates (or equivalent) of the location of the probe device 115 (e.g., vehicle 117 or UE 119 associated with the vehicle 117) and a probe or vehicle identifier (ID) that uniquely identifies the probe device 115. The probe or vehicle ID, for instance, allows for identifying all the probes in the probe data 113 associated with a particular probe device 115. In some embodiments, the probe or vehicle ID is a unique string assigned for a limited period of time to a probe device 115.

At step 703, the GPS coordinates are minimally mapmatched to a road segment and an offset from the beginning of the road segment in the direction of the traffic. Mapmatching, for instance, refers to converting the raw geographic coordinates of the probe data 113 to a specific road segment or road link represented, for instance, in the geographic database 111. It is contemplated that any mapmatching means can be used to perform the map matching including, but not limited to, point-based map matchers, path-based map matchers, and/or the like. The output to the map matching, for instance, is a correlation between the geographic coordinates of probe data point to a road link or road segment of the digital map data of the geographic database 111.

At step 705, the input data (e.g., the probe data 113) are grouped by probe ID so that all probe location data points are grouped according to the probe device 115 (e.g., vehicle 117) that generated the probe data 113. In one embodiment, the output of this grouping includes multiple sets of probe data 113 with each set belonging to a unique probe or vehicle ID.

At step 707, the location information or location data points in a grouped set may be ordered based on the time stamp associated with the probe data 113. In other words, the probes or location data points for a grouped set is sequenced according to time. For example, locations data points sampled first in time can appear earlier in a sequence and locations data points later in time can appear later in the sequence. In this way, the time-ordered sequence or probes location data points correspond to the detected location of a probe device 115 or vehicle 117 over time.

At step 709, based on the time stamps and location information in the grouped and time-ordered sets of probe data 113 for a probe device 115 or vehicle 117, the vehicle or probe path (e.g., the route taken by the probe device 115 or vehicle 117) can be established. This path or route, for instance, is determined from the probe trajectory represented by the time-ordered sequence of probe points. The map matching of the location data points enables the determination of a list of road segments or links traversed by each constructed path or route. Since, in some embodiments, the start and end route locations have associated time stamps, the travel time for the route can be determined as the difference of these time stamps. In addition, the travel time for any portion of the route can also be determined between any two time stamps and corresponding locations within the route or path. Therefore, in one embodiment, the mapping platform 119 can build a set of unique paths with at least the following attributes:

A list of road segments in the path or route;
Path start and end time stamps; and
Travel time to traverse the path.

In one embodiment, the set of unique paths can be used to create new data or update existing data in the path repository 125. For example, at step 711, as a path is determined from probe data 113, the mapping platform 109 determines if the path or route is already in the path trajectory. The attributes of the path (e.g., list of road segments, path start and/or end locations, etc.) can be compared against paths already in the path repository to determine if there is an existing path that matches the attributes. If there is no match (step 713), the mapping platform 109 creates a new path data record to represent or store the new path in the path repository. If there is a match indicating that similar or identical path or route exists in the path repository 125, the mapping platform 109 updates the existing route with the newly acquired path information. For example, the mapping platform 109 can update the existing path or route with new time stamps and travel time determinations. Optionally, because there will be at least two instances of the route, statistics can be calculated for the path and stored in the path repository 125 in association with the path data record. These statistics can include but are not limited to average travel time, maximum/minimum travel times, standard deviation of travel times, mean travel times, and/or any other equivalent statistic. In this way, the process 700 continuously builds and updates a library of observed routes as new probe data 113 is collected.

As discussed above, in one embodiment, the algorithm for generating pickup wait time predictions and pickup routes include two parts with the first part being the path construction process described with respect to FIG. 7. The second part of the algorithm is an asynchronous process that uses the path repository 125 to determine pickup wait time predictions and pickup routes according to the embodiments described herein. One, but not exclusive, example is described with respect to FIG. 8 which is a flowchart of a process for using the path repository 125 to predict pickup wait times and/or select pickup routes, according to one embodiment. In various embodiments, the mapping platform 109 and/or any of its components as depicted in FIG. 3 may perform one or more portions of the process 800 and may be implemented in, for instance, a chip set including a processor and a memory as shown in FIG. 13. As such, the mapping platform 109 and/or any of its components can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

At block 801, the mapping platform 109 receives from the ridesharing service platform 101 a request for a pickup for a wait time prediction and pickup route selection. The wait time prediction request can specify at least a location of the service requestor 103 (e.g., customer requesting a ride at a time stamp $TS_r$) and a location of the ridesharing service provider 105 (e.g., a ridesharing driver or vehicle that has accepted is to respond to the customer's ride request). The wait time prediction request can also include the algorithm parameters described in the embodiments above including but not limited to interval $T_w$, radius $R_a$, and radius $R_s$.

At step 803, the mapping platform 109 considers the paths stored in the path repository 125 as possible candidate routes for use in pickup wait time prediction and/or route selection. Next, the mapping platform 109 queries the path repository 125 for the paths (e.g., previously observed routes) that start within the vicinity of the service provider (e.g., within the area 507 associated with service provider location 503) and end within the vicinity of the customer (e.g., within the area 505 associated with service requestor location 501) (at step 805), while having a start and end time stamp within the time interval $T_w$ in the past from the current point in time $TS_r$ (e.g., paths with path start and end time in $[TS_r-T_w, TS_r]$) (at step 807). Next, at step 809, from this set, a subset of only routes with travel time less than the interval $T_w$ are selected.

The steps 803-811 can be illustrated with respect to the example scenario of FIG. 5. As shown in FIG. 5, the path repository 125 includes routes 509, 511, 513, and 515 that can be evaluated against the time-space vicinities associated with a pickup wait time/pickup route request to determine whether the routes are possible candidate routes that can be used for pickup wait time prediction and/or pickup route selection. In this example, the probe vehicle represented in route 509 is within the time interval $T_w$ but outside of the radius $R_s$. Therefore, route 509 is not within the vicinity of the ridesharing service provider location 503 represented by the area 507 and is not included in the set of candidate routes. The probe vehicle represented in route 513 is outside the radius $R_a$ and therefore is not within the vicinity of the service requestor location 501 represented by the area 505. Route 513 is also not included in the set of candidate routes. The probe vehicle represented by the route 515 is within the vicinities of both the service requestor location 501 and ridesharing service provider location 503, but has a travel time that is longer than the allowed maximum wait time $T_w$ and is excluded from the set of candidate routes. The probe vehicle represented by route 511 is within the spatial vicinities of both the service requestor location 501 and the ridesharing service provider location 503. In addition, the start time stamp ($TS_s$) and the end time stamp ($TS_a$) of route 513 is within the interval [$TS_r-T_w$, $TS_r$], meaning that route 513 starts and ends with a temporally similar context as the requested ride. Furthermore, the travel time of route 513 (e.g., the time $TS_s$ and $TS_a$) is less than the maximum wait time $T_w$. Based on these criteria, route 513 is added to the set of candidate routes from which a pickup wait time prediction and/or pickup route selection can be made for the ride request being evaluated.

Although route 513 is discussed as being the only preferred candidate route from candidate routes 509-513, any number of selected candidate routes, including zero, may be processed without departing from the contemplated embodiments. In embodiments where more than one selected candidate route is processed, the mapping platform 109 may output all or less than all of the set of candidate routes. In such an embodiment, the mapping platform 109 may rank or group the preferred candidate routes according to various parameters including, for example, being ranked by shortest travel time, shortest travel route, or a combination thereof.

In one embodiment, at step 813, the route(s) in the resulting set of candidate routes are analyzed with a goal of determining the fastest route and the high confidence range of the predicted pickup wait time. The analysis can be as straightforward as always returning the route with shortest travel time and establishing the range as a span between the shortest and longest travel time in the subset. In other embodiments, the analysis may also include more involved statistical treatment of the eligible routes in the subset, so that the predicted pickup wait time is selected as mean, median or mode of the travel times and that the range is established based on the one, two or three standard deviations of the travel times. The analysis can also utilize historical data to establish a range of high confidence. In one embodiment, this can be achieved by adding into the path repository statistics for each path that reflect average and standard deviation of all travel times of all the vehicles that have traversed the exact same path within the time interval $T_w$. In one embodiment, such statistics can be included in the path repository 125 or equivalent (e.g., the geographic database 111 and/or the probe repository 123).

In some embodiments, the mapping platform 109 may also group or rank preferred candidate routes by confidence, i.e., the candidate routes with a higher confidence will be given greater preference. In such embodiments, the mapping platform 109 may determine a confidence score according to certain parameters including, by way of example, how much time has transpired since the candidate route was initially processed into the mapping platform 109, i.e., how old the route information is. This may be accomplished by comparing the difference between the candidate route's timestamp compared to the service request's timestamp. In such an example, newer candidate routes may be given greater confidence. Another exemplary confidence parameter may be the candidate route's relative time of day. In such an example, the service request timestamp may indicate that the request was made at 1:00 pm and the ridesharing service 119 may assign a higher confidence to candidate routes that began at 1:00 pm or close in time thereto. In this way, the mapping platform 109 accounts for time-dependent dynamic traffic conditions, e.g., rush hour traffic versus off-peak traffic. Another exemplary confidence parameter may be the day of the week the candidate route was initially processed. In such an example, the service request timestamp may indicate that the request was made on a Saturday and the mapping platform 109 may assign a higher confidence to candidate routes that were previously traveled on a Saturday. In this way, the mapping platform 109 accounts for day-dependent dynamic traffic conditions, e.g., traffic may be greater on weekdays versus weekends. Another exemplary confidence parameter may be whether the candidate route was originally traversed on a holiday. In such an example, the service request timestamp may indicate that the request was made on a holiday, e.g., Christmas, and the mapping platform 109 may assign a higher confidence to candidate routes that were previously traveled on that same holiday (Christmas). In this way, the mapping platform 109 accounts for holiday-dependent dynamic traffic conditions, e.g., traffic may be greater during holidays.

Another exemplary confidence parameter may be whether a special event occurred near the candidate routes. In such an example, the service request timestamp may indicate that the request was made during a special event that is occurring near the service requestor location 501, the service provider location 503, or anywhere between. By way of example, a special event may be a sporting event that greatly impacts the traffic in the surrounding area. In such an example, the mapping platform 109 may assign a higher confidence to candidate routes that were previously traveled during the same or similar special event. In this way, the mapping platform 109 accounts for event-dependent dynamic traffic conditions, e.g., traffic may be greater during a sporting event. In such an embodiment, the mapping platform 109 may receive information from third parties indicating the date, time, location, and duration of such special events. For example, the mapping platform 109 may interact with an external system and/or database to determine whether a special event is scheduled. In such an example, the special event may be a baseball game and the mapping platform 109 may interact with the team's website to determine what time parking facilities open, the time that the game is to begin, the time that the game is scheduled to end, and the time that parking facilities close. Additionally, the mapping platform 109 may receive periodic updates on the status of any relevant scheduled times, e.g., the baseball game is tied and is proceeding to overtime (extra innings). Although a special event is discussed in terms of a sporting event, any event that would impact traffic can be used to account for event-dependent dynamic traffic conditions without departing from the contemplated embodiments. Other special events include, for example, a cruise ship docking in a relevant area and the influx of traffic due to passengers deboarding the ship.

Returning to step 405 of FIG. 4, the mapping platform 109 provides the travel time of the most representative route or routes (e.g., selected from the stored paths/routes of the path repository 125 according to the embodiments described above) from the vehicle location (e.g., ridesharing service provider location 503) to the pickup location (e.g., service requestor location 501 or other location designated by the customer, driver, and/or ridesharing service) as an output. This output represents data indicating a wait time for a vehicle at the vehicle location to reach the pickup location, according to an embodiment. In other words, in one embodiment the pickup wait time estimation represents a prediction of how long a service requestor 103 located at a pickup location is expected to wait for a ridesharing service provider 105 (e.g., a driver or vehicle) that is located at or starting from its vehicle location to reach the service requestor 103's pickup location and begin the requested ride. This wait time, in turn, is based on how long and along what route a ridesharing service provider 105 takes to reach the customer pickup location.

In one embodiment, the wait time can be provided as a value equal to or derived from the travel time of the most representative route. For example, if the travel time of a matching probe path in the path repository 125 indicates that the travel time is M minutes (e.g., calculated based on the start and end time stamps of the matching probe path), the mapping platform 109 can output the wait time as being equal to the travel time, so that the provided wait time estimation can also M minutes. The mapping platform can derive or calculate the pickup wait time prediction from the travel time by, for instance, adding an additional time factor (e.g., wait time=M+factor) where the factor is some designated additional time, multiplying by the additional factor (e.g., wait time=M×factor), and/or any other similar processing. In other embodiments, the output can include a range of pickup wait times that represent a high confidence range of values that are statistically determined from multiple routes matching the route selection criteria discussed with respect to the embodiments described herein. For example, the pickup wait time range prediction can be based on the average, mean, minimum, maximum, standard deviations, etc. of the travel times of the matching paths from the path repository 125.

In addition or alternatively, the mapping platform 109 can provide the most representative route(s) selected from the path repository 125 as an output. For example, the selected route can then be presented to the ridesharing service provider 105 and/or ridesharing service requestor 103 as a recommended route for the ridesharing service provider 105 to pick up the service requestor 103 (e.g., via their respective devices such as UEs 119 and/or other systems associated with vehicles 117).

In one embodiment, the output represents an initial pickup wait time prediction and pickup route selection (e.g., initial wait time estimate data 127). The mapping platform 109 can continually or periodically collection additional data (e.g., additional probe data 113; additional contextual data about the pickup route–such as event data, traffic data, weather data, etc.; and/or the like) to update the wait time estimate data 127. In one embodiment, the update can continue until the ridesharing service provider 105 has picked up the service requestor 103.

Figure 9:
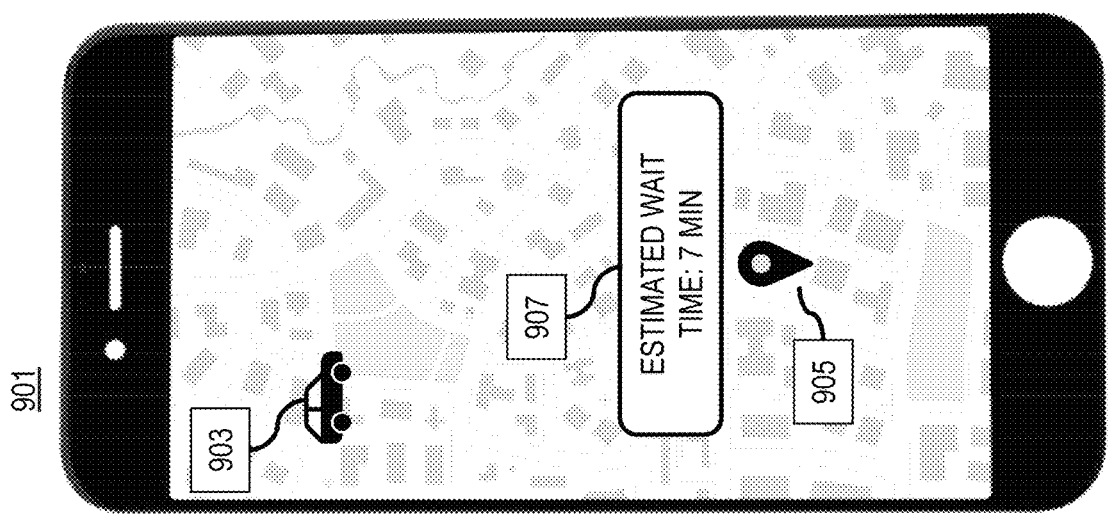
FIG. 9 illustrates an exemplary user interface that can be presented on a service requestor device, according to one embodiment.
Figure 10:
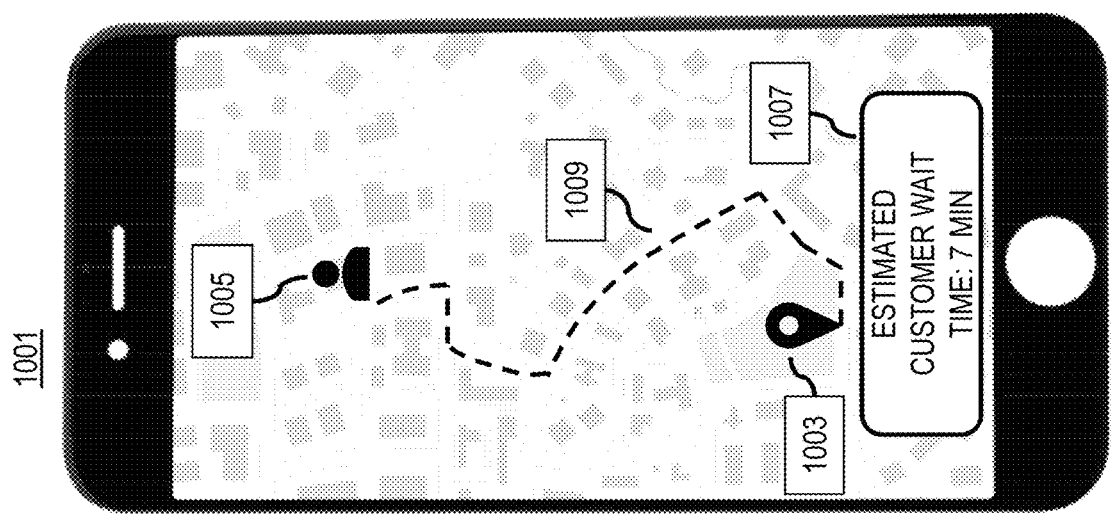
FIG. 10 illustrates an exemplary user interface that can be presented on a ridesharing service provider device, according to one embodiment.

Example user interfaces for presenting the pickup wait time prediction and/or pickup route selection output from the mapping platform 109 are illustrated in FIGS. 9 and 10. In the examples of FIGS. 9 and 10, a service requestor 103 has requested a ride through the ridesharing service platform 101 and a ridesharing service provider 105 has accepted the ride request. The ridesharing service platform 101 has then requested and received a pickup wait time prediction and pickup route selection from the mapping platform 109 according to the embodiments described herein. The wait time estimate data 127 provided by the mapping platform 109 are used to present the user interfaces illustrated below.

FIG. 9 illustrates an exemplary user interface (UI) 901 that can be presented on a service requestor device (e.g., UE 119 or equivalent) via a ridesharing application 121. In one embodiment, the ridesharing service platform 101 provides data to the ridesharing application 121 for presenting the predicted pickup wait time generated in response to a ride request. As shown, the UI 901 presents a mapping display with a representation 903 of the current location of the ridesharing service provider 105 responding to the ride request, and a well as a representation 905 of the service requestor 103's pickup location. UI 901 also includes a UI element 907 displaying the pickup wait time estimate (e.g., "Estimated wait time: 7 min"). As previously described, this pickup wait time estimate is based on the travel times probe paths that have been recorded as traveling between the time-space vicinities of the service provider and the service requestor location to improve the wait time prediction accuracy. In one embodiment, the displayed estimated wait time in UI element 907 can be dynamically updated as additional path data is collected and available in the path repository 125 for processing.

FIG. 10 illustrates an exemplary UI 1001 that can be presented on a ridesharing service provider device (e.g., UE 119 or equivalent) via a ridesharing application 121. As with the example of FIG. 9, the mapping platform 109 can provide wait time estimate data 127 to the ridesharing application 121 to present to the ridesharing service provider 105. In this example, the service provider UI 1001 is similar to the service requestor UI 901, but can provide additional data (e.g., a recommended pickup route) relevant to the ridesharing service provider 105. As shown, the UI 1001 presents a mapping display with a representation 1003 of the ridesharing service provider 105's current location (e.g., vehicle location), a representation 1005 of the service requestor 103's pickup location, and a UI element 1007 displaying the wait time estimate data 127 for the current ride request (e.g., "Estimated customer wait time: 7 min"). In addition, the UI 1001 presents a representation 1009 of the recommended pickup route. As described in the embodiments above, the recommended pickup route is based on the selected probe path previously observed between the service provider location and the service requestor location (e.g., fastest path between the locations recorded in the path repository occurring within a designated temporal vicinity of the ride request). In one embodiment, the UI 1001 can also be used to provide navigation guidance instructions for the ridesharing service provider 105 to pick up the service requestor 103 within the estimated wait time.

FIG. 1 is a diagram of a system capable of providing an accurate wait time prediction, according to one embodiment. As discussed above, service providers experience many technical difficulties in providing an accurate wait time predication to service requestors. To address this problem, a system 100 of FIG. 1 introduces the capability to provide accurate wait time predictions based on historical probe data collected from probe vehicles that have previously travelled the same route as a service requests anticipates taking. To accomplish this, the system 100 compiles, maintains, and updates a library of probe data collected from previous vehicles that have travelled a particular route. In providing an accurate pickup wait time prediction, the system 100 queries historical data for routes that have previously been traversed that have a start point and an end point within a threshold distance from the service provider's location and the service requestor's location, respectively. These candidate routes are then processed to determine the fastest and/or shortest routes. The system 100 returns the best route (or best set of routes) to the service provider. The system 100 also maintains and updates the historical database by continuously updating stored routes as new information is collected.

Returning to FIG. 1, in one embodiment, the mapping platform 109 has access to the probe repository 123 and path repository 125 for storing probe data 113, probe paths or routes identified from the probe data 113, wait time estimate data 127, and/or other data/information processed or used determining pickup wait time predictions and/or pickup route selections according to the embodiments described herein. In one embodiment, the mapping platform 109 also has connectivity to the geographic database 111 to provide location-based services based on the probe repository 123, path repository 125, and/or wait time estimate data 127 generated therefrom. The mapping platform 109 can operate, for instance, in connection with the probe devices 115 (e.g., vehicles 117 and/or UEs 119) to provide ridesharing, wait time prediction, routing, traffic, and/or other mapping-related services. Though depicted as automobiles, it is contemplated the vehicles 117 can be any type of transportation vehicle manned or unmanned (e.g., planes, aerial drone vehicles, motorcycles, boats, bicycles, etc.). In one embodiment, the UE 119 may be a personal navigation device ("PND"), a cellular telephone, a mobile phone, a personal digital assistant ("PDA"), a watch, a camera, a computer and/or any other device that supports location-based services, e.g., ridesharing, digital routing and map display, etc. In one embodiment, it is contemplated that the UE 119 may be interfaced with an on-board navigation system of a vehicle 117 or wirelessly/physically connected to the vehicle 117 to serve as the probe collection system, ridesharing system, navigation system, etc. Also, the UE 119 may be configured to access the communication network 107 by way of any known or still developing communication protocols to transmit and/or receive probe data 113, wait time estimate data 127, path data, and/or other related data processed or used in the embodiments described herein.

Also, the UE 119 and/or vehicle 117 may be configured with an application 121 for collecting probe data 113 and/or for interacting with the ridesharing service platform 101, mapping platform, and/or any other component of the system 100 for determining pickup wait time prediction and/or pickup route selection according to the embodiments described herein. The application 121 may be any type of application that is executable on the vehicle 117 and/or UE 119, such as ridesharing applications, mapping applications, location-based service applications, navigation applications, content provisioning services, camera/imaging applications, media player applications, social networking applications, calendar applications, and/or the like. In one embodiment, the application 121 may act as a client for the mapping platform 109 and/or the ridesharing service platform 105 and perform one or more functions of the mapping platform 109/ridesharing service platform 101 alone or in combination with the mapping platform 109/ridesharing service platform 101.

The probe devices 115 (e.g., vehicle 117 and/or UE 119 may be configured with various sensors (not shown for illustrative convenience) for acquiring and/or generating probe or trajectory data 113 associated with a probe devices 115 (e.g., UE 119, vehicle 117) or an associated a driver, other vehicles, conditions regarding the driving environment or roadway, etc. For example, sensors may be used as GNSS/GPS receivers for interacting with one or more navigation satellites to determine and track the current speed, position and location of a vehicle travelling along a roadway. In addition, the sensors may gather other vehicle sensor data such as but not limited to tilt data (e.g., a degree of incline or decline of the vehicle during travel), motion data, light data, sound data, image data, weather data, temporal data and other data associated with the vehicles 117 and/or UEs 119. Still further, the sensors may detect local or transient network and/or wireless signals, such as those transmitted by nearby devices during navigation of a vehicle 117 along a roadway (Li-Fi, near field communication (NFC)) etc. This may include, for example, network routers configured within a premise (e.g., home or business), another UE 119 or vehicle 117 or a communications-capable traffic system (e.g., traffic lights, traffic cameras, traffic signals, digital signage, etc.).

It is noted therefore that the above described data may be transmitted via communication network 107 as probe data 113 and/or corresponding probe path data (e.g., trajectory data) according to any known wireless communication protocols. For example, each UE 119, mobile application 121, user, vehicle 117, and/or other probe device 115 may be assigned a unique probe identifier (probe ID or vehicle ID) or pseudonym for use in reporting or transmitting probe data 113 collected by the vehicles 117 and UEs 119. In one embodiment, each probe device (e.g., vehicle 117 and/or UE 119) is configured to report probe data as probe location data points (also referred to as probes), which are individual data records collected at a point in time that records location data. Probes or probe points can be collected by the system 100 from the probe devices (e.g., UEs 119, applications 121, and/or vehicles 117) in real-time, in batches, continuously, or at any other frequency requested by the system 100 over, for instance, the communication network 107 for processing by the mapping platform 109.

In one embodiment, the mapping platform 109 retrieves aggregated probe points gathered and/or generated by probe devices 115 resulting from the travel of the probe devices 115 (e.g., UEs 119 and/or vehicles 117) on a road segment or other travel network. The probe repository 123 can be used to store a plurality of probe points, and the probe repository 125 can be used to store the resulting probe paths, trajectories, or routes (e.g., path) generated from the probe repository 123. In one embodiment, a time sequence of probe points grouped by probe ID specifies a trajectory or route—i.e., a path traversed by an individual probe device 115 over a period of time. In one embodiment, the route or path data of the path repository 125 can be used for pickup wait time prediction and/or pickup route selection for ridesharing or equivalent services.

In one embodiment, the communication network 107 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 109 and/or ridesharing service platform 101 may be platforms with multiple interconnected components. The mapping platform 109 and/or ridesharing service platform 101 may include multiple servers, intelligent networking devices, computing devices, components, and corresponding software for determining pickup wait time predictions and/or pickup route selection according to the embodiments described herein. In addition, it is noted that the mapping platform 109 may be a separate entity of the system 100, or a part of the ridesharing service platform 101 and/or any other component of the system 100.

By way of example, the ridesharing service platform 101, mapping platform 109, and probe devices 115 (e.g., vehicles 117 and/or UEs 119) communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically characterized by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
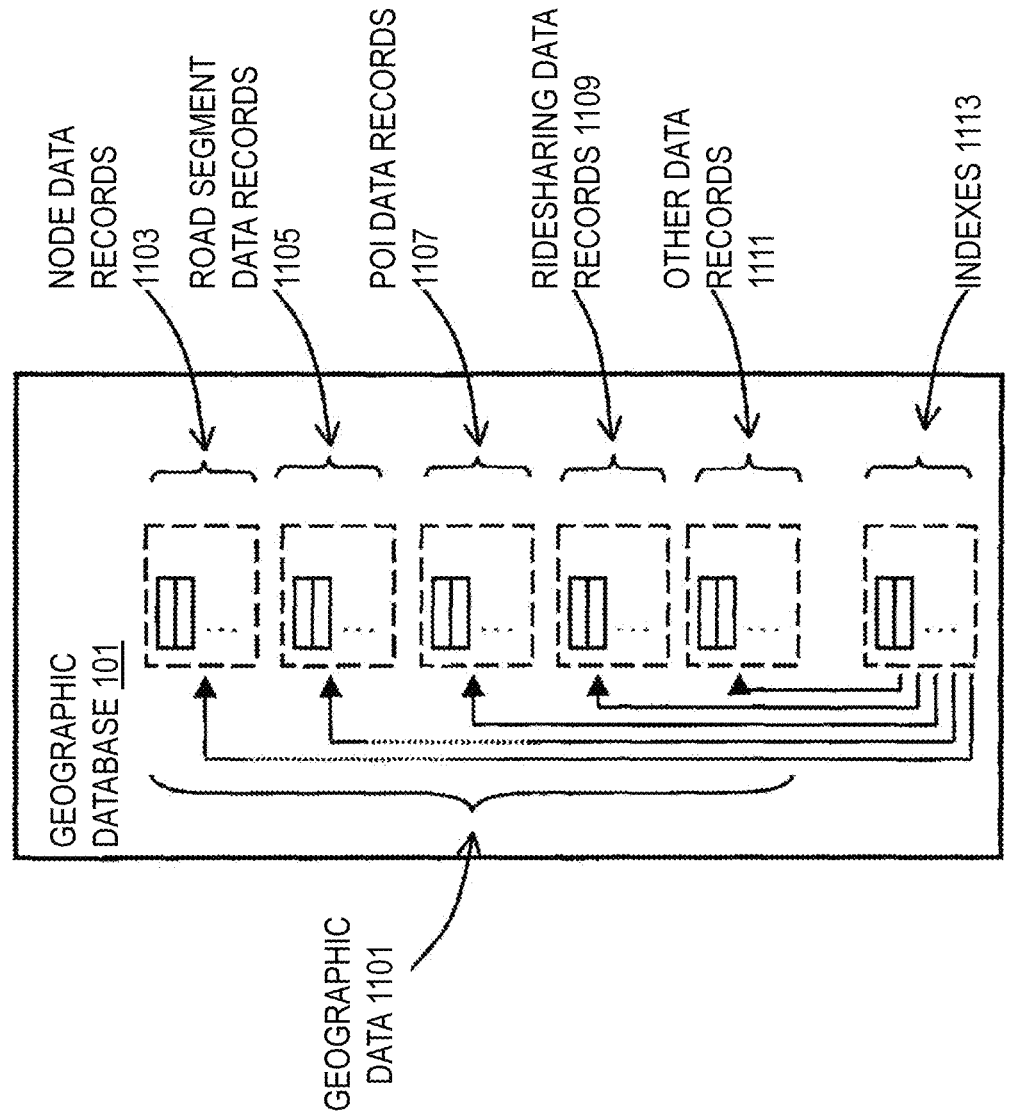
FIG. 11 is a diagram of a geographic database, according to one embodiment.

FIG. 11 is a diagram of a geographic database 111, according to one embodiment. In one embodiment, the geographic database 111 includes geographic data 1101 used for (or configured to be compiled to be used for) mapping and/or navigation-related services, such as for constructing routes, e.g., encoding and/or decoding parametric representations into paths and/or routes. In one embodiment, the geographic database 111 includes high resolution or high definition (HD) mapping data that provide centimeter-level or better accuracy of map features. For example, the geographic database 111 can be based on Light Detection and Ranging (LiDAR) or equivalent technology to collect billions of 3D points and model road surfaces and other map features down to the number lanes and their widths. In one embodiment, the HD mapping data (e.g., Other data records 1111) capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels. In some embodiments, the HD mapping data also comprises temporal information (e.g., timestamps) relating to the service request.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself "Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 111 is stored as a hierarchical or multi-level tile-based projection or structure. More specifically, in one embodiment, the geographic database 111 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 111 includes node data records 1103, road segment or link data records 1105, POI data records 1107, ridesharing data records 1109, other data records 111, and indexes 1113, for example. More, fewer, or different data records can be provided. In one embodiment, additional data records (not shown) can include cartographic ("carto") data records, routing data, and maneuver data. In one embodiment, the indexes 1113 may improve the speed of data retrieval operations in the geographic database 111. In one embodiment, the indexes 1113 may be used to quickly locate data without having to search every row in the geographic database 111 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as points of interest (POIs), such as gasoline stations, hotels, restaurants, museums, stadiums, offices, automobile dealerships, auto repair shops, buildings, stores, parks, etc. The geographic database 111 can include data about the POIs and their respective locations in the POI data records 1107. The geographic database 111 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 111 can also include ridesharing data records 1109 for storing routes previously traversed by probe devices 115 (e.g., including paths and/or routes with associated times determined according to the embodiments described herein) as well as data on traveled routes and their respective properties. In addition, the ridesharing data records 1109 can store postprocessing rule sets for propagating, correcting, and/or reducing the uncertainties in the routes, paths, and/or probe data. The ridesharing data records 1109 can also store data selection rules (e.g., in a map data extension layer) for selecting from among multiple sets of route data that may be available for a given road link. The ridesharing data records 1109 can also store confidence or accuracy determinations for the route and/or path data. By way of example, the ridesharing data records 1109 can be associated with one or more of the node records 1103, road segment records 1105, and/or POI data records 1107 to support use cases such as enhanced mapping UIs, autonomous driving, dynamic map updates, etc. In one embodiment, the ridesharing data records 1109 are stored as a data layer of the hierarchical tile-based structure of the geographic database 111 according to the various embodiments described herein. In one embodiment, the geographic database 111 can provide the tile-based route detection ridesharing data records 1109 to automate route data propagation in a road network using route and/or path construction and selection.

In one embodiment, as discussed above, the other data records 1111 model road surfaces and other map features to centimeter-level or better accuracy. The other data records 1111 may also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the other data records 1111 are divided into spatial partitions of varying sizes to provide data to probe devices 115 and other end user devices with near real-time speed without overloading the available resources of the probe vehicles 117 and/or devices 115 (e.g., computational, memory, bandwidth, etc. resources).

In one embodiment, the other data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the other data records 1111.

In one embodiment, the other data records 1111 may also include real-time sensor data collected from probe devices 115 in the field. The real-time sensor data, for instance, integrates real-time traffic information, weather, and road conditions (e.g., potholes, road friction, road wear, etc.) with highly detailed 3D representations of street and geographic features to provide precise real-time information also at centimeter-level accuracy. Other sensor data can include vehicle telemetry or operational data such as windshield wiper activation state, braking state, steering angle, accelerator position, and/or the like.

In one embodiment, the geographic database 111 can be maintained by the service requestor 103 in association with the ridesharing service 119 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicle 117 and/or UE 119) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 117 or UE 119. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a ridesharing wait time prediction and/or pickup route selection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed herein.

Figure 12:
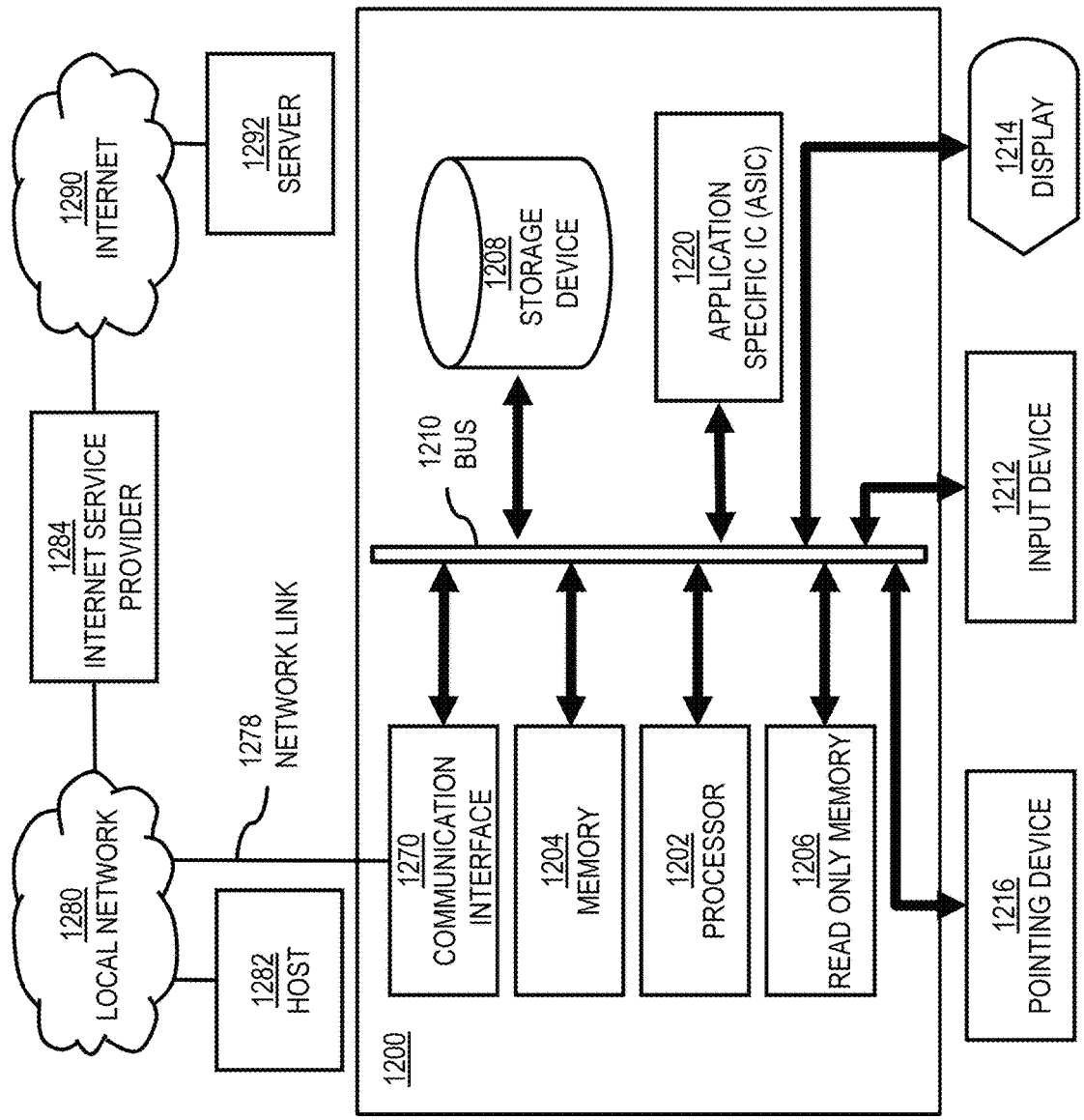
FIG. 12 is a diagram of a computer system upon which an embodiment of the invention may be implemented, according to one embodiment.

FIG. 12 illustrates a computer system 1200 upon which an embodiment of the invention may be implemented. Computer system 1200 is programmed (e.g., via computer program code or instructions) to provide an accurate travel time prediction as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing an accurate travel time prediction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing an accurate travel time prediction. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing an accurate travel time prediction, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general, the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 109 for providing an accurate travel time prediction.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to provide a ridesharing wait time prediction and/or pickup route selection as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide a ridesharing wait time prediction and/or pickup route selection. The memory 1305 also stores the data associated with or generated by the execution of the inventive steps.

Figure 14:
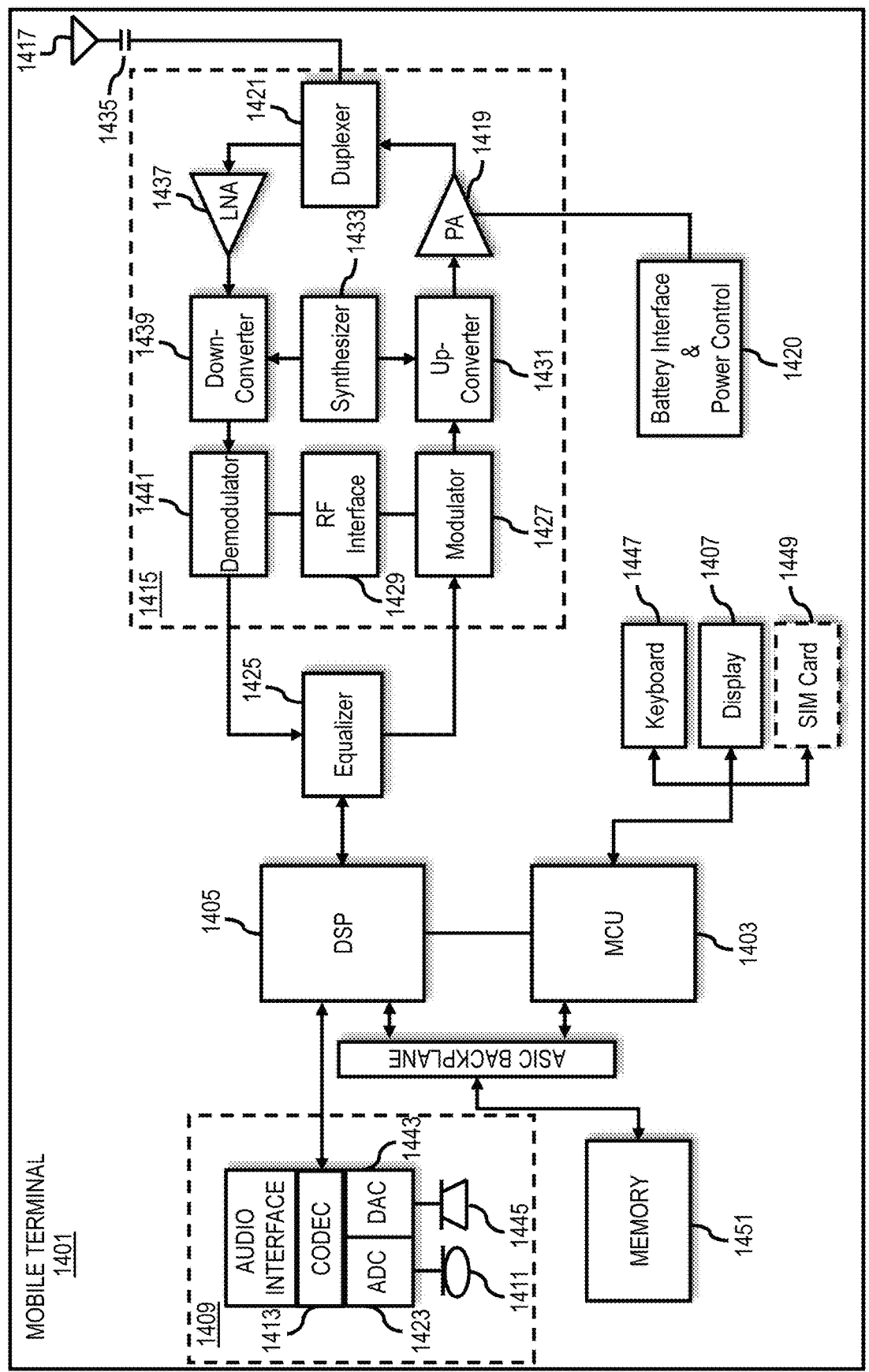
FIG. 14 is a diagram of a mobile station (e.g., handset) that can be used to implement an embodiment.

FIG. 14 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide a ridesharing wait time prediction and/or pickup route selection. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a mapping platform configured to collect probe data from a geographic area, probe data collected within a first threshold proximity of a vehicle location in the geographic area and a second threshold proximity of a pickup location in the geographic area, the probe data being collected from a Global Navigation Satellite System (GNSS) receiver of at least one probe vehicle that has previously traversed between the first proximity of the vehicle location and the second threshold proximity of the pickup location, wherein an extent of the first threshold proximity, the second threshold proximity, or a combination thereof is selected based on a sparsity of the probe data, a wait time prediction accuracy, or a combination thereof, wherein the probe data is divided into spatial partitions to provide the probe data with real-time speed and to reduce computational resources, memory resources, bandwidth resources, or a combination thereof;
   processing, by the mapping platform, the probe data in real time to identify a travel time of a route taken by the at least one probe vehicle from the first proximity threshold of the vehicle location to the second threshold proximity of the pickup location to represent a current travel condition; and
   providing, by the mapping platform, the travel time as an output indicating a wait time for a vehicle at the vehicle location to reach the pickup location based on determining that the travel time is less than a maximum wait time.

2. The method of claim 1, wherein the probe data is further determined based on a ride request timestamp.

3. The method of claim 1, wherein the probe data are within a predefined time interval, and wherein the predefined time interval is based on a ride request timestamp.

4. The method of claim 1, wherein the route is selected from one or more candidate routes represented in the probe data based on a ride request timestamp.

5. The method of claim 1, wherein the route is a candidate route represented in the probe data that has a start time that is closest to a ride request timestamp.

6. The method of claim 1, wherein the route is selected based on determining the travel time of the route is less than a predefined travel time interval.

7. The method of claim 1, wherein the pickup location is a geographic area within a predefined distance of a ride requestor location.

8. The method of claim 1, further comprising:
   periodically adjusting the wait time; and
   providing the adjusted wait time as an updated output.

9. The method of claim 1, further comprising:
   sending the route associated with the travel time to a driver of the vehicle at the vehicle location.

10. An apparatus comprising:
    at least one processor; and
    at least one memory including computer program code for one or more programs, the at least one memory and the computer program code configured to, with the at least on processor, cause the apparatus to perform at least the following,
    determine, by a mapping platform configured to collect probe data from a geographic area, probe data collected within a first threshold proximity of a vehicle location in the geographic area and a second threshold proximity of a pickup location in the geographic area, the probe data being collected from a Global Navigation Satellite System (GNSS) receiver of at least one probe vehicle that has previously traversed between the first proximity of the vehicle location and the second threshold proximity of the pickup location, wherein an extent of the first threshold proximity, the second threshold proximity, or a combination thereof is selected based on a sparsity of the probe data, a wait time prediction accuracy, or a combination thereof, wherein the probe data is divided into spatial partitions to provide the probe data with real-time speed and to reduce computational resources, memory resources, bandwidth resources, or a combination thereof;
    process, by the mapping platform, the probe data in real time to identify a travel time of a route taken by the at least one probe vehicle from the first proximity threshold of the vehicle location to the second threshold proximity of the pickup location to represent a current travel condition, the travel time representing a wait time for a vehicle at the first proximity threshold of the vehicle location to reach the second threshold proximity of the pickup location; and
    provide, by the mapping platform, the route as an output based on determining that the travel time is less than a maximum wait time.

11. The apparatus of claim 10, wherein the output is sent to a driver of the vehicle, the vehicle, or a combination thereof.

12. The apparatus of claim 10, wherein the probe data is further determined based on a ride request timestamp.

13. The apparatus of claim 10, wherein the route is selected from one or more candidate routes represented in the probe data based on a ride request timestamp.

14. The apparatus of claim 10, wherein the route is a candidate route represented in the probe data that has a start time that is closest to a ride request timestamp.

15. The apparatus of claim 10, wherein the route is selected based on determining the route has a length less than a predefined length.

16. A non-transitory computer-readable storage medium for predicting a pickup wait time, carrying one or more sequences of one or more instructions which, when executed by one or more processors, cause an apparatus to perform:

determining, by a mapping platform configured to collect probe data from a geographic area, probe data collected within a first threshold proximity of a vehicle location in the geographic area and a second threshold proximity of a pickup location in the geographic area, the probe data being collected from a Global Navigation Satellite System (GNSS) receiver of at least one probe vehicle that has previously traversed between the first proximity of the vehicle location and the second threshold proximity of the pickup location, wherein an extent of the first threshold proximity, the second threshold proximity, or a combination thereof is selected based on a sparsity of the probe data, a wait time prediction accuracy, or a combination thereof, wherein the probe data is divided into spatial partitions to provide the probe data with real-time speed and to reduce computational resources, memory resources, bandwidth resources, or a combination thereof;

processing, by the mapping platform, the probe data to identify a travel time of a route taken by the at least one probe vehicle from the first proximity threshold of the vehicle location to the second threshold proximity of the pickup location to represent a current travel condition; and providing, by the mapping platform, the travel time as an output indicating a wait time for a vehicle at the vehicle location to reach the pickup location based on determining that the travel time is less than a maximum wait time.

17. The non-transitory computer-readable storage medium of claim 16, wherein the probe data is further determined based on a ride request timestamp.

18. The non-transitory computer-readable storage medium of claim 16, wherein the probe data are within a predefined time interval, and wherein the predefined time interval is based on a ride request timestamp.

19. The non-transitory computer-readable storage medium of claim 16, wherein the route is selected from one or more candidate routes represented in the probe data based on a ride request timestamp.

20. The non-transitory computer-readable storage medium of claim 16, wherein the route is a candidate route represented in the probe data that has a start time that is closest to a ride request timestamp.

\* \* \* \* \*